(12) United States Patent
Miñano et al.

(10) Patent No.: US 8,094,393 B2
(45) Date of Patent: Jan. 10, 2012

(54) REFLECTORS MADE OF LINEAR GROOVES

(75) Inventors: Juan Carlos Miñano, Madrid (ES); Pablo Benitez, Madrid (ES)

(73) Assignee: Light Prescriptions Innovators, LLC, Altadena, CA (US)

( * ) Notice: Subject to any disclaimer, the term of this patent is extended or adjusted under 35 U.S.C. 154(b) by 422 days.

(21) Appl. No.: 12/456,406

(22) Filed: Jun. 15, 2009

(65) Prior Publication Data

US 2010/0002320 A1    Jan. 7, 2010

Related U.S. Application Data

(60) Provisional application No. 61/131,884, filed on Jun. 13, 2008.

(51) Int. Cl.
*G02B 5/04* (2006.01)

(52) U.S. Cl. .............................................. 359/834

(58) Field of Classification Search ............... 359/529, 359/530, 834, 838, 850, 853
See application file for complete search history.

(56) References Cited

U.S. PATENT DOCUMENTS

| | | | | |
|---|---|---|---|---|
| 3,992,593 A | * | 11/1976 | Heine | 369/18 |
| 4,120,565 A | | 10/1978 | Rabl et al. | 350/286 |
| 4,453,203 A | | 6/1984 | Pate | 362/345 |
| 6,540,382 B1 | | 4/2003 | Simon | 362/339 |
| 7,256,938 B2 | * | 8/2007 | Barton et al. | 359/576 |
| 2003/0016539 A1 | | 1/2003 | Miñano et al. | 362/347 |

* cited by examiner

*Primary Examiner* — Euncha Cherry
(74) *Attorney, Agent, or Firm* — Drinker Biddle & Reath LLP

(57) ABSTRACT

An embodiment of a method of designing a grooved reflector comprises selecting two given wavefronts; and designing two surfaces meeting at an edge to form a groove such that the rays of each of the given wavefront become rays of a respective one of the given wavefronts after a reflection at each of the surfaces. Multiple grooves may be combined to form a mirror covering a desired area. A mirror may be manufactured according to the design.

19 Claims, 25 Drawing Sheets

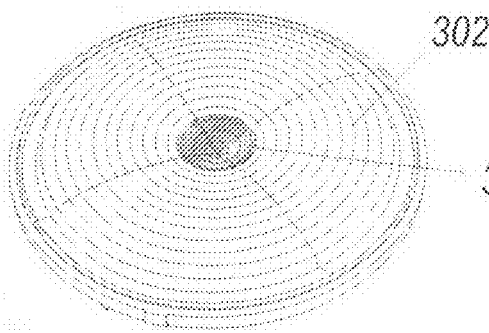 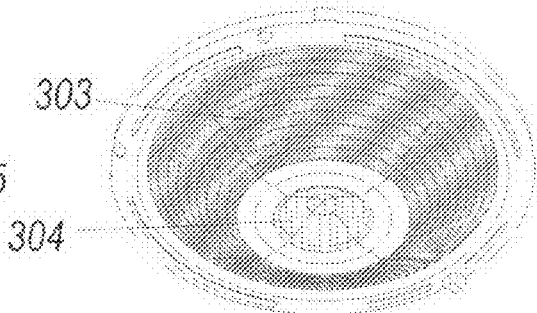
Fig. 30  Fig. 31
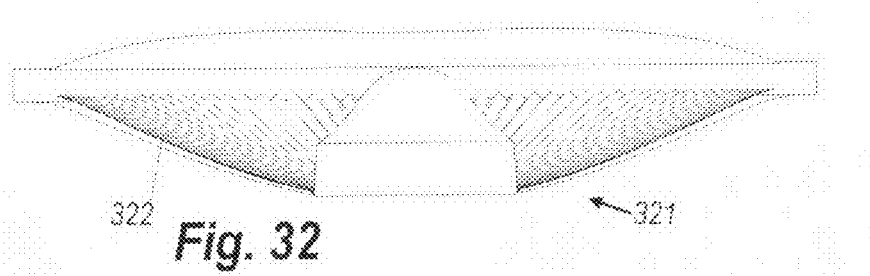
Fig. 32
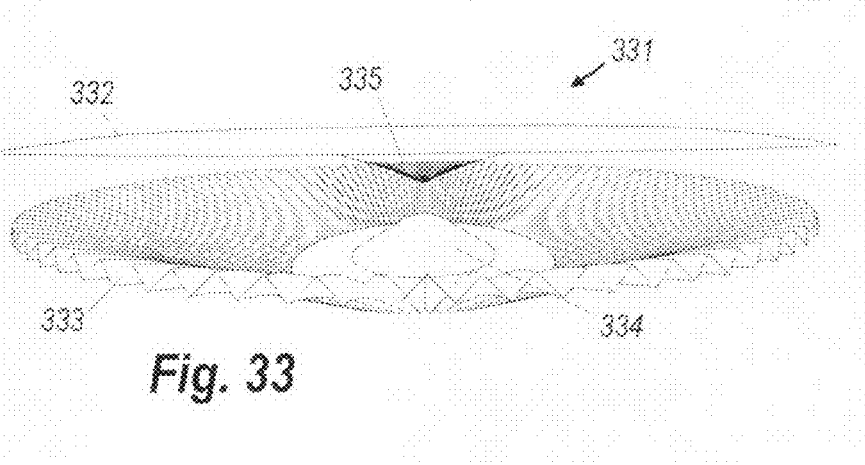
Fig. 33

REFLECTORS MADE OF LINEAR GROOVES

CROSS REFERENCE TO RELATED APPLICATION

This application claims benefit from U.S. Provisional Application No. 61/131,884, filed Jun. 13, 2008, which is incorporated by reference herein in its entirety.

FIELD OF THE INVENTION

The present application relates generally to light concentration and illumination, and more particularly to reliable high efficiency reflectors. The devices contain grooved structures that with two reflections couple the rays of two given wavefronts exactly, with no limitation about the groove size. The groove profiles disclosed herein are designed with the SMS (Simultaneous Multiple Surface) method, which is a direct method that does not require a numerical optimization algorithm. Additionally, the grooves vertices reside on lines which are not restricted to be planar curves. The application of those grooves to the substitution of metallic reflectors in known devices, as the RXI (Refraction-refleXion-Internal reflection) or XR (refleXion-Refraction) as described in U.S. Pat. No. 6,639,733 to Miñano et al.), is also disclosed.

In general, a "groove" as discussed in the present application is a structure with two surfaces that face partly towards each other, usually at least approximately in a V shape, so that a light ray can enter the V at the open top, reflect off each side in turn, and exit through the open top of the V. However, the present application is primarily concerned with devices operating by total internal reflection, so that the light is in a medium of higher refractive index than the medium outside the V shape. Typically, the inside of the groove is a dielectric material such as glass or plastic, and the outside is air, so that the structure that is optically and mathematically a groove, and is described in this specification as a "groove," is in many cases mechanically a projecting ridge on the back of a dielectric body within which the "groove" is defined.

BACKGROUND OF THE INVENTION

V-shaped grooves that by two ray bounces emulate the functionality of a single-bounce reflector of light have been proposed and used in different applications. For instance, grooves with flat facets and cylindrical symmetry on a flat surface are known as a brightness-enhancing film (BEF), manufactured by the 3M Corporation under the brand name Vikuiti, for displays.

The same geometry but used in a different way (as a reflector of solar beam radiation) was proposed to make heliostats for solar thermal energy by M. O'Neill, "Analytical and Experimental Study of Total Internal Reflection Prismatic Panels for Solar Energy Concentrators" Technical Report No. D50000/TR 76-06, E-Systems, Inc., P.O. Box 6118, Dallas, Tex. (1976), and A. Rabl, "Prisms with total internal reflection," Solar Energy 19, 555-565 (1977), also U.S. Pat. No. 4,120,565 By A. Rabl and V. Rabl.

A parabolic dish reflector using V-shaped radial grooves on the paraboloid surface (i.e., the guiding lines of the grooves are contained in meridian planes of the original parabolic reflector) is being manufactured by the company Spectrus (http://www.spectrusinc.com/) for illumination applications. See, for instance, the "Reflexor Retrofit system" at http://spectrusinc.com/products-detail/reflexor-retrofit-system-178/8/. Similar reflectors were also proposed for solar applications. See A. Rabl, *Prisms with total internal reflection*, Solar Energy 19, 555-565 (1977) and also U.S. Pat. No. 4,120,565 to A. Rabl and V. Rabl. See also M. O'Neill, *Analytical and Experimental Study of Total Internal Reflection Prismatic Panels for Solar Energy Concentrators*, Technical Report No. D50000/TR 76-06, E-Systems, Inc., P.O. Box 6118, Dallas, Tex. (1976). In those designs, the cross section of the grooves is flat, which limits the device performance unless the groove size is small compared to the receiver or source sizes.

Improving that groove-size limitation, patent application US 2008/0165437 A1 by DiDomenico discloses a design method for V-shaped radial grooves the cross-sectional profile of which is not flat, and applies that method to parabolic dish reflectors. The non-flat profile is designed by parameterizing the surface using Bezier splines and using a numerical multi-parameter optimization method to minimize a certain cost function. The convergence of such a method to a global minimum is not guaranteed, and paragraph [0110], page 10 of US 2008/0165437 A1 specifically mentions the existence of many local minima that may trap the optimization algorithm, and explains that the selection of the cost function and the initial guess of the free-form surfaces are "critical." No example of that cost function is given in US 2008/0165437 A1.

US 2008/0165437 A1 also discloses other devices as the XX (two reflecting surfaces) or RXI whose V-shaped radial grooves are designed by such an optimization procedure. No description is given of how the non-grooved surfaces are designed. US 2008/0165437 A1 claims in paragraph [0177], page 36 that their devices perform close to the physical limits. However, two contradictions are visible:

1. In FIG. 6A of US 2008/0165437 A1, the edge rays at the input are clearly not transformed into edge rays at the output, which is the necessary and sufficient condition to achieve the claimed physical limit (maximum concentration). The edge rays at the input are those contained in the surface of the cones (labeled as 305 in FIG. 3 and named so in paragraph [0146], page 33 of US 2008/0165437 A1), and the rays at the output must impinge on the contour of circle 610 of said FIG. 6A. The fact the input rays are well inside the circle 610 indicates that the phase space volume is far from been fully filled, and thus it performs also far from the concentration limit.

2. The device shown in FIG. 15B of US 2008/0165437 A1 cannot be a well performing concentrator device, since its thickness at the center is only 0.19 times the diameter, which is below the compactness limit of that concentrator device (0.23) easily deducible from the Fermat principle.

Summarizing, the grooved reflectors in the prior art are limited to guiding lines which are either straight parallel lines (i.e. prismatic 90° retroreflectors) or radial planar curves, and the cross section profile of the groove is flat or Bezier splines optimized by numerical algorithms.

SUMMARY OF THE INVENTION

Embodiments of the invention provide methods of designing grooved reflectors.

Embodiments of the invention provide methods of manufacturing grooved reflectors, comprising designing a reflector by a method in accordance with an embodiment of the invention, and manufacturing a reflector in accordance with the design.

Embodiments of the invention provide grooved reflectors designed by a method in accordance with an embodiment of the invention, and novel grooved reflectors per se, including reflectors identical to reflectors that would result from the design and manufacturing methods of the invention, whether or not actually designed by such methods.

Embodiments of the invention provide collimators, concentrators, and other optical devices incorporating reflectors according to the invention.

BRIEF DESCRIPTION OF THE DRAWINGS

The above and other aspects, features and advantages of the present invention will be apparent from the following more particular description thereof, presented in conjunction with the following drawings wherein:

FIG. 2b is a perspective view of the same prism of FIG. 2a

FIG. 7b shows the grooved reflector of the solution of FIG. 7a.

FIG. 10b is a back side view of the grooved reflector shown in FIG. 10a.

FIG. 11b is a back side view of the grooved reflector shown in FIG. 11a.

FIG. 20b shows the next steps in the design of construction of FIG. 20a.

FIG. 30 shows a front surface of the device shown in FIG. 29.

FIG. 31 shows a back reflector surface and a refractive cavity surface of the device shown in FIG. 29.

FIG. 32 shows a cross-section view of a device similar to that shown in FIG. 29, wherein a reflector surface comprises by a V-shaped grooved reflector.

FIG. 33 shows a device similar to that shown in FIG. 29, with grooved reflectors instead of all the metallic reflecting surfaces of FIG. 29.

DETAILED DESCRIPTION

1. Introduction

A better understanding of the features and advantages of the present invention will be obtained by reference to the following detailed description of the invention and accompanying drawings, which set forth illustrative embodiments in which various principles of the invention are utilized.

Figure 1:
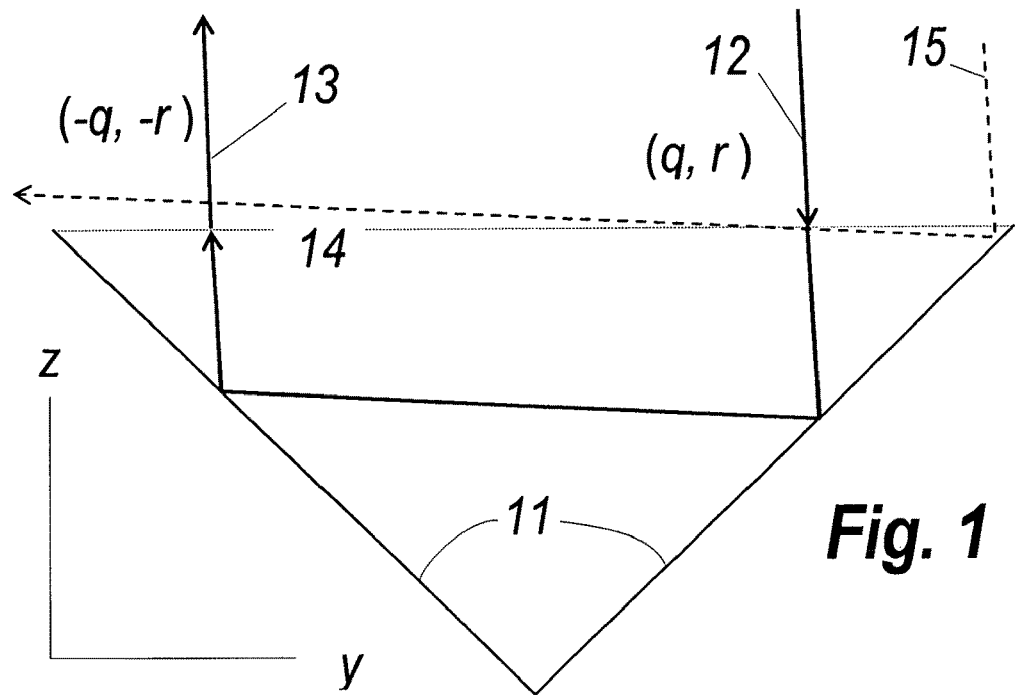
FIG. 1 shows a cross section of the V-shaped prismatic retro-reflector

Referring to FIG. 1, an embodiment of a prismatic retro-reflector is formed by a 90 deg V shaped trough-like mirror. FIG. 1 shows a cross section of the V-shaped reflector 11, as well as the coordinate system used to describe it. The x-axis, perpendicular to the plane of the figure, is the axis of translational symmetry of the linear retro-reflector. An important property of this reflector configuration is shown for an incident ray 12 with direction cosines (p,q,r), successively reflected at each side of the V trough. The incident ray 12 is then reflected as ray 13 with direction cosines (p,−q,−r), that is, its components in the y and z axis are retro-reflected. This has to be compared with a conventional flat reflector with its normal in the y direction, where the direction of the reflected ray would be (p,−q,r), or compared with the cube-corner retro-reflector, where any ray reflected by all three faces leaves completely retro-reflected, i.e., with direction (−p,−q,−r).

Let $v_i$ be the incident ray vector (with components p,q,r) and let $v_o$ be the reflected ray vector for a ray undergoing two reflections. The reflection law for these rays can be written: $v_o = v_i - 2(n \cdot v_i)n - 2(s \cdot v_i)s$, where n is the unit normal vector to entry aperture 14 and s is the unit vector perpendicular both to the groove's axis of linear symmetry and to n. In the case of FIG. 1, n coincides with the unit vector z and s coincides with the unit vector y. The vector t is the unit tangent along the groove (x in FIG. 1). Then $s \cdot t = n \cdot t = \cdot n = 0$. This reflection law establishes that the ray vector components along the vectors n and s change in sign after reflection while the remaining component, along t, keeps its sign and magnitude. In a conventional reflection with normal vector n, the reflection law is $v_o = v_i - 2(n \cdot v_i)n$ and only the component of the ray vector in the n direction changes its sign. The two remaining components keep their original sign and magnitude.

Since any vector $v_i$ can be written in terms of its components in the tri-orthogonal system based on n, s and t as $v_i = (n \cdot v_i)n + (s \cdot v_i)s + (t \cdot v_i)t$, the reflection law for grooved surfaces can be written as $v_o + v_i = 2(t \cdot v_i)t$.

All the rays reaching the entry aperture 14 will undergo at least one reflection, but not all rays will have two. For instance, ray 15 leaves the retro-reflector with a single reflection.

Figure 2A:
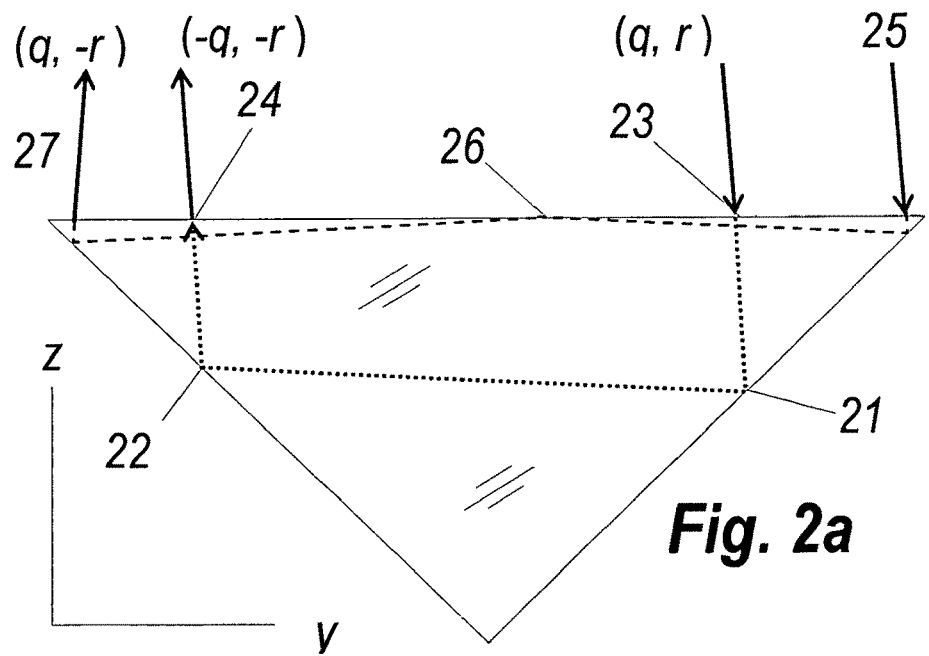
FIG. 2a shows one way to manufacture a linear retro-reflector is using a dielectric prism.
Figure 2B:
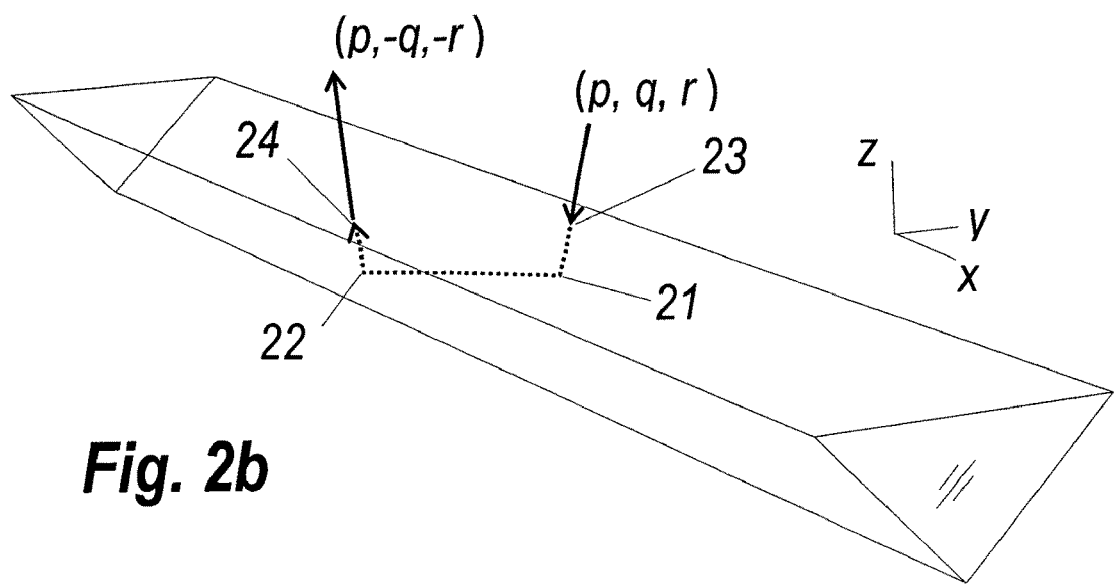

One way to manufacture a linear retro-reflector is using a dielectric prism, such as that shown in FIG. 2a. FIG. 2b is a perspective view of the same prism. The main interest of this solution is that the reflections 21 and 22 at the two sides of the V trough can be total internal reflections (TIR) which inherently have high efficiency as long as the reflecting faces are highly smooth. The entry aperture is now one of the prism faces and consequently the rays are refracted upon entering at 23 or exiting the dielectric prism at 24. The entering and exiting refractions compensate for each other, so that the direction cosines of the reflected ray are still (p,−q,−r) as in the preceding non-dielectric case (provided the ray undergoes two reflections). Unlike the preceding case there are now rays such as 25 that undergo not two but three reflections, with the additional one being 26 at the entry aperture interface. The direction of the escaping ray 27 is (p,q,−r), as in a conventional single reflection at a plane normal to the z axis.

Figure 3:
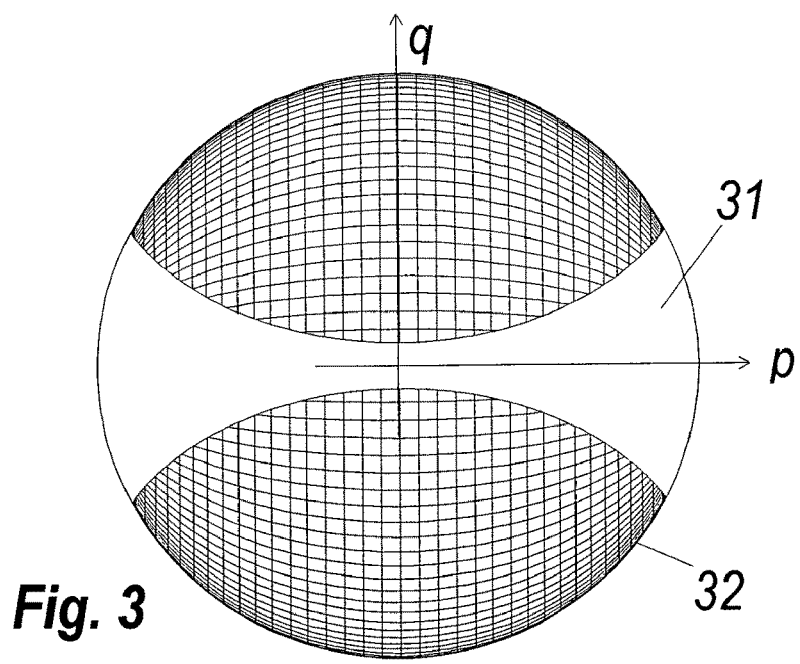
FIG. 3 is a diagram of the (p,q) plane showing the region where an incident ray (p,q,r) undergoes a single TIR (Total Internal Reflection) at each of the two sides of the V trough of FIGS. 2a and 2b.

The condition for an incident ray (p,q,r) to undergo a single TIR at each of the two sides of the V trough is that the angle with the normal at the points of reflection 21 and 22 be greater than the critical angle arcsin(1/n) where n is the refractive index of the dielectric. For example if n=1.494 this condition is fulfilled by the rays (p,q,r) with the (p,q) component being inside the solid region 31 of FIG. 3. FIG. 3 shows in solid white color the region 31 of the (p,q) plane where an incident ray (p,q,r) undergoes a single TIR (Total Internal Reflection) at each of the two sides of the V trough. The cross-hatched regions 32 represent values of p,q that are valid, but for which the desired double TIR does not occur. The condition for this double TIR is that the angle with the normal at 21 and at 22 in FIGS. 2a and 2b be greater than the critical angle arcsin(1/n) where n is the refractive index of the dielectric. By definition the direction cosines fulfill $p^2+q^2+r^2=1$, so the (p,q) component is inside the circle 32 in FIG. 3 so that $p^2+q^2 \leq 1$. The narrowest portion of the solid region 31 corresponds to rays with p=0, i.e., rays contained in planes normal to the x axis. For these rays q must be in the range $\pm\{(n^2-1)^{1/2}-1\}/2^{1/2}$, which implies that n must be greater than $2^{1/2}=1.414$ for a non null range of q to exist at p=0.

For rays with p≠0, i.e., for sagittal rays, two total internal reflections are achieved over a bigger range of q.

1.1 Arrays of Prisms as Reflector Surfaces

The limited range for which two TIR are achieved restricts the applicability of these prisms as reflectors to those cases in which the rays of interest impinge the prism with angular coordinates within the solid region 31 of FIG. 3.

The grooved reflector only works for rays with angular coordinates within the solid region 31 of FIG. 3. In general the remaining rays pass through the reflector at either reflection point 21 or reflection point 22. This can be advantageous for solar applications because parts of the reflector can become non reflecting (and thus cannot concentrate radiation) when the reflector is not aimed at the sun, if the reflector is aligned so that for these parts the sunlight is arriving with angular coordinates outside region 31 of FIG. 3.

Figure 4A:
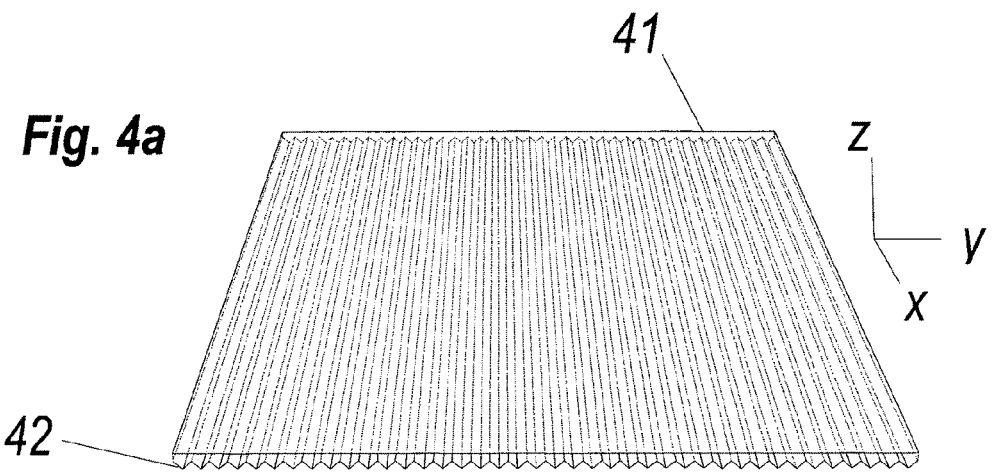
FIG. 4a shows an array of retroreflector prisms
Figure 4B:
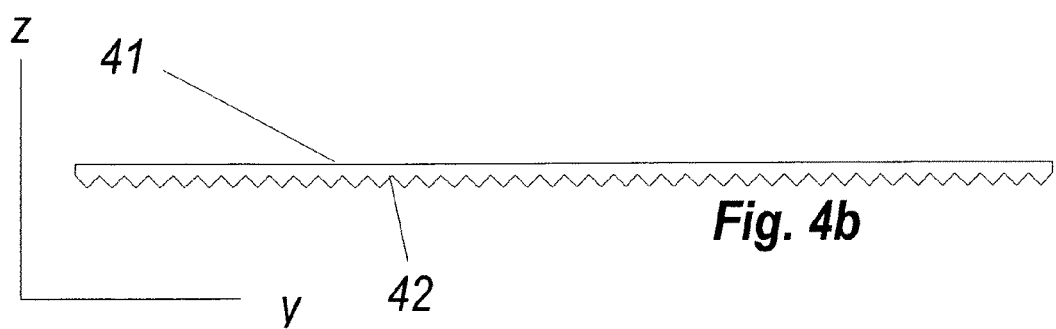
FIG. 4b shows the cross-section of an array of retroreflector prisms.

Consider an array of prisms such as that shown in FIG. 4a, with cross-section shown in FIG. 4b. This type of array is known as a brightness-enhancing film (BEF). Such a film is manufactured by the 3M Corporation. Unlike the prism of FIG. 2a and FIG. 2b, the entry aperture plane of the array 41 is located above the tips of the mirror grooves 42. This ensures that rays such as ray 25 of FIG. 2a typically do not undergo two reflections at both sides of the same groove but on opposite sides of different grooves (besides the TIR reflection at the entry aperture, such as 26 of FIG. 2a.

Figure 5:
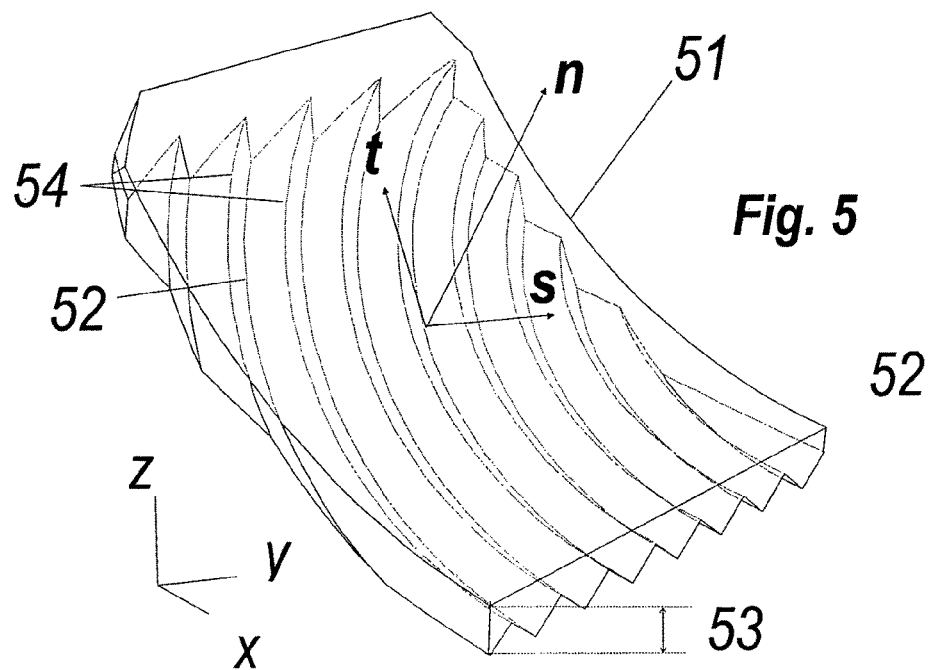
FIG. 5 shows the more general case of a free-form sheet.

Next consider a more general case of a free-form sheet, as shown in FIG. 5. The entry aperture 51 is a free-form surface with the parametric equation $A=A(\alpha,\beta)$, where $\alpha$ and $\beta$ are parameters defining position on the entry surface 51. The unit surface-normal vector n depends on the position of the point within the surface, i.e., $n=n(\alpha,\beta)$. The grooves are no longer linear but in this embodiment their bottom edges follow curves 52 that are located on a notional surface parallel to the entry aperture. The parametric equation of this parallel surface is $A_b = A(\alpha,\beta) - \tau \cdot n(\alpha,\beta)$, where the constant $\tau$ is the distance 53 between surfaces. The equation of one of the groove guiding curves 52 can be written as a relationship between the parameters $\alpha$ and $\beta$, e.g., $\phi(\alpha,\beta)=0$. Assume that we have chosen the parameters $\alpha$ and $\beta$ such that the guiding curve equations can be written as $\phi(\alpha,\beta) \equiv \beta - \beta_0 = 0$, where different values of $\beta_0$ define different guiding curves. This means that the parametric equation of each curve is $A_b=A(\alpha,\beta)-\tau n(\alpha,\beta_0)$, with $\alpha$ being the parameter along the curve. For the sake of brevity this equation will hereinafter be referred to as $C=C(\alpha)$.

Designate as t the unit tangent to guiding curves, so that t is parallel to $dC/d\alpha$, and let s be $s=t\times n$. These three mutually perpendicular unit vectors ($|s|=|t|=|n|=1$) vary in direction along the guiding curve (their directions depend on $\alpha$). Except for t they are distinct from the Frenet tri-orthogonal system of the guiding curve [D. J. Struik, Lectures on Classical Differential Geometry, p. 19 (Dover, N.Y., 1988)].

1.2 Surface Equation of an Array of V-Shaped Curved Grooves

The equations of the surfaces of the groove sides corresponding to the guiding curve $C(\alpha)$ can be written as $G_l(\alpha,\gamma)=C(\alpha)+\gamma(s-n)$ and $G_r(\alpha,\gamma)=C(\alpha)+\gamma(s+n)$. The parameters of these surfaces are $\alpha$ and $\gamma$. The first equation is valid for $\gamma<0$ and defines one side of the groove. The other equation is valid for $\gamma>0$ and defines the other side. Both equations can be unified as $G(\alpha,\gamma)=C(\alpha)+\gamma s+|\gamma|n$, valid for any $\gamma$ and giving the guiding curve when $\gamma=0$. Note that n and s depend solely on $\alpha$ while moving along a single guiding curve. The implicit surface equation of the array can be obtained as the surface that separates (bounds) the volume defined by the union of the points belonging to the inner part (interior) of any groove. Let $l(x,y,z)=0$ be the implicit equation of a groove's lateral surface having a parametric equation $G_l(\alpha,\gamma)$, and let $r(x,y,z)=0$ be the implicit equation corresponding to the other side, $G_r(\alpha,\gamma)$. By properly choosing the sign of the functions $l(x,y,z)$ and $r(x,y,z)$, the interior of the groove can be defined by the points $(x,y,z)$ for which the functions $l(x,y,z)$, and $r(x,y,z)$ are positive. The surface of the array of grooves ("grooved reflector") is the boundary of the solid volume defined as the union of the interiors of the grooves. We will call this volume U. Let us define the "reflector aperture" as the surface of the convex hull (http://en.wikipedia.org/wiki/Convex_hull) of the complementary volume of U. The intersections of a groove surface's sides with the reflector aperture of the groove array are the "groove aperture boundary" curves 54.

When the groove-array surface forms one face of a sheet, the other face is called the "sheet aperture" 51. For this solid to be a single piece, in the case of the V-shaped grooves, it is necessary for the adjacent guiding curves to be closer than $2\tau$, where $\tau$ is the grooved reflector thickness, defined as the maximum distance between any point of the guiding curves 52 and the sheet aperture 51. (This distance is measured along the local normal to the sheet aperture.) The equation of the sheet aperture, together with the grooved surface itself, completely defines the solid sheet.

1.3 Surface Equation of an Array of Curved Grooves with Constant Cross-Section

Consider next the case of non V-shaped grooves, which are also of interest for optical applications. A cross-section curve is contained in the corresponding plane transverse to the guiding curve $C(\alpha)$. Of greatest interest are grooves with identical cross-sections, because the grooved surfaces are then easier to tool than in the case of a varying cross-section. If the cross-section is constant along the groove, then every cross-section curve can be defined with the same parametric equation $J=J(x,y,\gamma)$ when expressed as a function of two unit vectors x and y contained in the transverse plane. The parameter along the cross-section curve is $\gamma$. For the V-shaped cross-section case, $J(x,y,\gamma)=\gamma x+|\gamma|y$. In the general case, the equation of the groove surface is $G(\alpha,\gamma)=C(\alpha)+J(s,n,\theta(\gamma),\gamma)$, where s and n were previously defined with directions varying along the guiding curve (i.e., varying with $\alpha$) and $\theta(\gamma)$, the angle between the vector x (or y) and s (or n), is a function of the parameter $\gamma$ along the curve trajectory.

1.4 Thin Reflector Approximation

Assume that the cross-sectional sizes of the grooves and the curvatures of the guiding curves are small enough to be locally linear, so that when a ray exits through the aperture of the array of grooves it does so at the same point of the aperture where it enters, and so that the deflection suffered by the rays is the same as being in a linear symmetric groove with axis of linear symmetry being tangent to the guiding curve. This situation is known as the thin reflector approximation. Note that there is no assumption about the curvatures of the cross section curves. The size that makes this approximation valid depends upon the application. When the groove is V-shaped the thin reflector approximation means that the rays are reflected at the point of incidence on the reflector aperture, and most of them (those rays undergoing two reflections in the groove) satisfy the reflection law $v_r+v_i=2(t\cdot v_i)t$.

2. The Cartesian Oval Problem

Design with V-Shaped Retro-Reflector Arrays

The problem is then to design a free-form grooved sheet that reflects a given incident ray vector field $v_i(r)$ into another known exiting ray vector field $v_o(r)$, with r being a point of the space, i.e., $r=(x,y,z)$. The problem of finding a refractive or reflective surface that transforms any vector field $v_i(r)$ into another ray vector field $v_o(r)$ is called the Generalized Cartesian Oval problem [R. Winston, J. C. Miñano, P. Benítez, Nonimaging Optics, (Elsevier, 2005), see especially p. 185].

The reflection law for an array of V-shaped grooves establishes within the thin sheet approximation that the tangent to the grooves' guiding lines is parallel to $v_o+v_i$, so that it fulfills $(v_o+v_i)\times t=0$. The only condition on n (besides being a unit vector) is that it be normal to t. Let $\psi(r)=0$ be the (implicit) equation of the entry aperture surface of the retro-reflector sheet. Then its gradient $\nabla\psi$ must be parallel to n at the points of the surface $\psi(r)=0$. Then $\nabla\psi\cdot\{v_o(r)+v_i(r)\}=0$. This is a first order linear differential equation with the function $\psi(r)$ as the unknown. Note that the vector fields $v_i(r)$ and $v_o(r)$ are known because they have been prescribed. The integration of this equation, together with the boundary conditions, gives the desired surface $\psi(r)=0$. A suitable boundary condition is an arbitrary curve to be contained in the surface $\psi(r)=0$. This is remarkably different from the Generalized Cartesian Oval problem, where the differential equation for the conventional reflector surface $\psi_c=0$ that reflects the ray vector field $v_i(r)$ into the ray vector field $v_o(r)$, establishes that the normal to the surface must be parallel to $v_o(r)-v_i(r)$, i.e., $\nabla\psi_c\times\{v_o(r)-v_i(r)\}$)0. This is a total differential equation, so that only a point on the surface can be a boundary condition. The extra degree of freedom in the conventional reflector design problem is due to the extra freedom in choosing the guiding curves once the aperture surface is given.

Once $\nabla\psi\cdot\{v_o(r)+v_i(r)\}=0$ has been integrated (so that $\psi(r)=0$ is known), it only remains to calculate the guiding curves and to select $\tau$. A guiding curves is calculated by integration of the vector field $v_o(r)+v_i(r)$, initiated from any point contained in $\psi(r)=0$. These curves are necessarily contained in $\psi(r)=0$ because this surface has been obtained with the condition of being tangent to the vector field $v_o(r)+v_i(r)$. The initial points for integration are selected to fulfill the thin sheet approximation. The angle $\theta(\gamma)$ is chosen to maximize the number of rays deflected according to the law $v_r+v_i=2(t\cdot v_i)t$ (i.e., the number of rays undergoing two reflections) among the rays of interest. In general this condition implies that the V-shape local plane of symmetry is tangent to n, (i.e., tangent to ∇ψ) or tangent to $v_r-v_i$. The sheet thickness τ is selected for mechanical stiffness.

Figure 6:
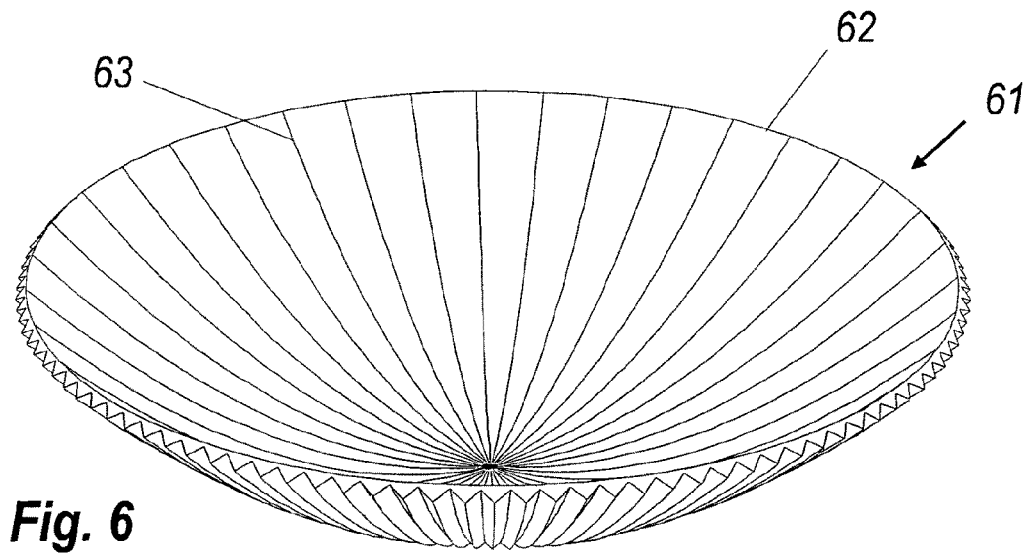
FIG. 6 shows a radially-symmetric grooved reflector in which the groove guiding lines are parabolas.

As an example consider $v_i(r)=r/|r|=(x,y,z)/(x^2+y^2+z^2)^{1/2}$ and $v_o(r)=z$, where $z=(0,0,1)$ in Cartesian coordinates. The solution is any surface containing a family of guiding curves that are parabolas with focus at the origin and axis z. The solution shown in FIG. 6 is a paraboloid 61. In this solution the boundary condition is a circle 62 normal to the z axis and centered on the z axis. The guiding curves 63 are radial and the planes of symmetry of the grooves coincide with the meridian planes. In this case, the solution coincides with the conventional reflector case mentioned above.

Figure 7A:
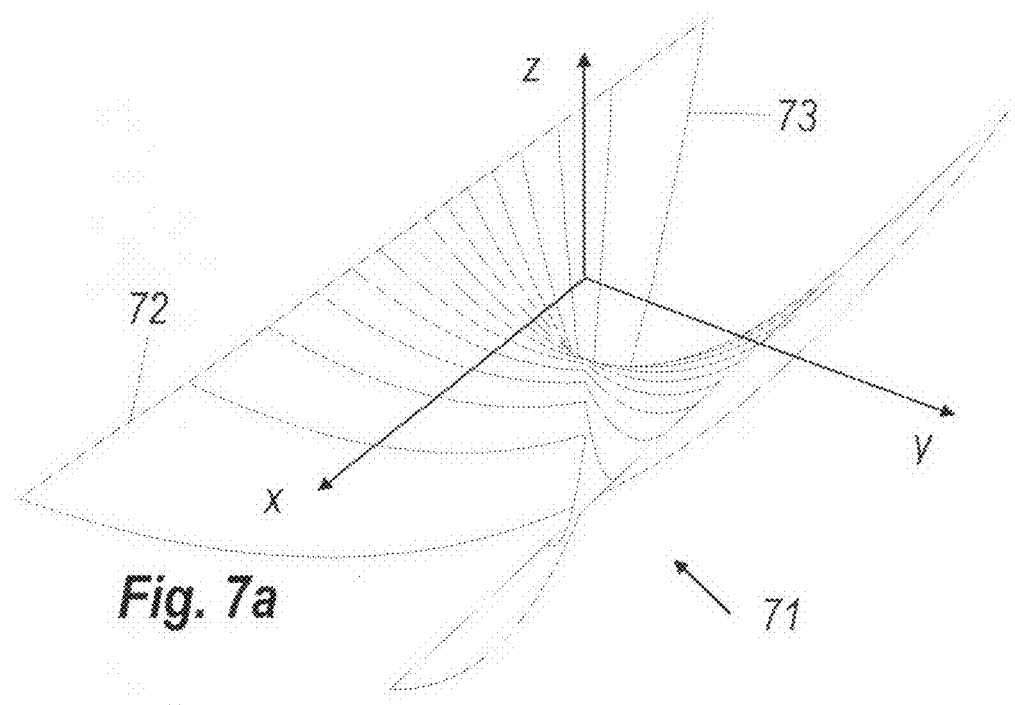
FIG. 7a shows the non-planar guiding lines of another solution of the same Cartesian oval problem as a paraboloid, in which the guiding lines intersect a pair of straight lines.
Figure 7B:
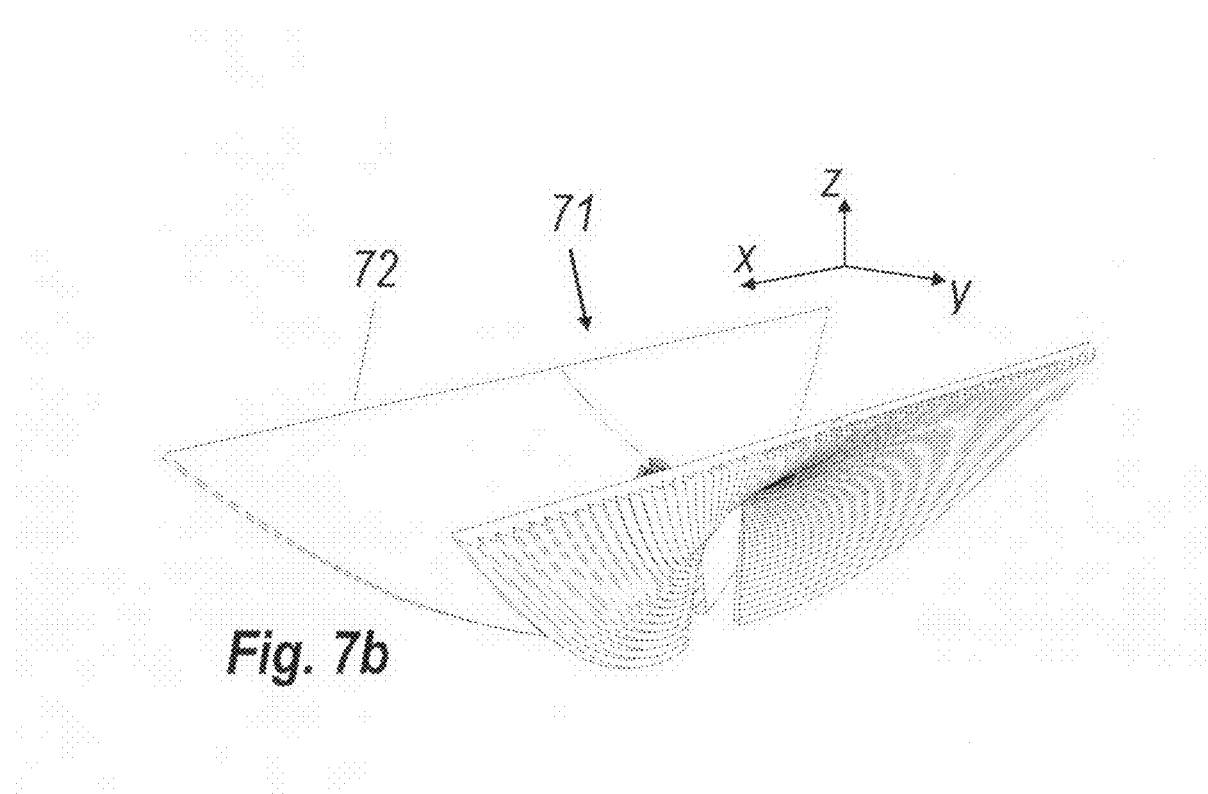

FIG. 7a shows the solution 71 when the boundary condition is that the surface must contain the straight line 72. The guiding curves 73 are contained in meridian planes (planes containing the z axis). FIG. 7b shows the grooved reflector of this solution, with the local planes of symmetry of the grooves being tangent to the surface normals.

This design procedure does not ensure that the rays of the vector field $v_i(r)$ that impinge on the surface will undergo two TIRs at the grooved reflector. This condition should be checked after the surface has been calculated. Some points of the surface will fulfill it and others will not.

Retro-reflector arrays that lie on developable surfaces are of particular practical interest because they can be molded on flat sheets, the same as BEF film, and tailored to the application by trimming and bending.

3. Design of Free-Form Retro-Reflectors Arrays with Constant Cross-Section Grooves Another design problem is a free-form grooved reflector that replaces a free form conventional reflector in a nonimaging application. Assume that in this application rays from a source are to be sent to a target.

3.1 Calculation of the Guiding Curves

There follow three procedures to obtain guiding lines.

Figure 8:
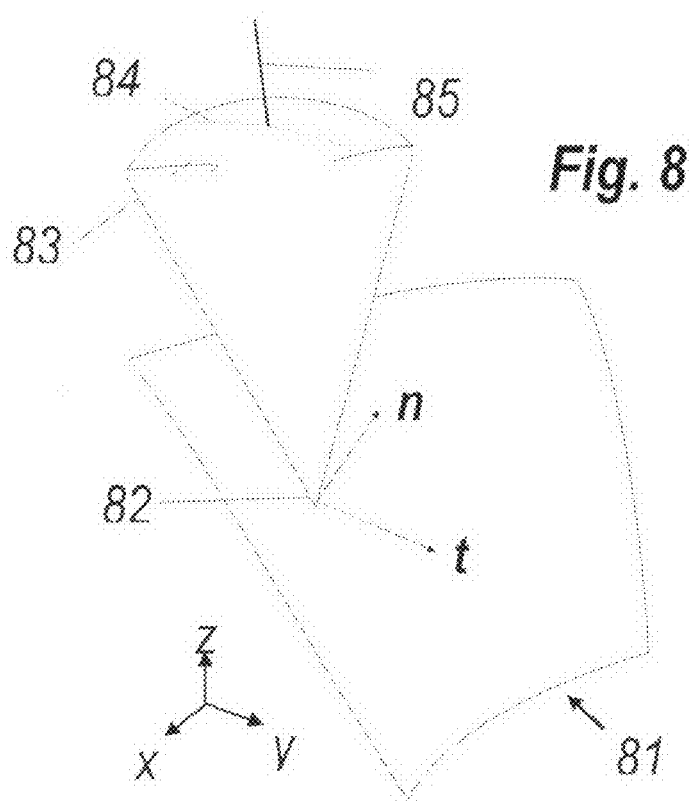
FIG. 8 shows a generic free-form conventional reflector.

1) FIG. 8 shows a generic free-form conventional reflector 81 that is assumed to be a part of a nonimaging system transferring optical power from a source to a target. The rays linking source and target that hit a generic point 82 are represented by the solid angle characterized by the spherical sector 83. This solid angle represents the directions of these rays before being deflected at the point 82. The surface normal at the point 82 is n. Consider the set of planes containing the vector n normal to the surface 81 and look for that plane that divides the solid angle into the most highly symmetric parts.

For this purpose, consider a set of spherical coordinates ρ,φ,θ centered at the point 82 and such that the z axis coincides with the direction of n. The solid angle can be represented as the cross-hatched region 92 in a chart of φ–θ coordinates 91, such as the one shown in FIG. 9. The symmetric image of 92, with respect to a plane 93 tilted an angle φ with respect to the reference, is the region 94. We look for the plane 93 maximizing the intersection region between 92 and 94. When the region 92 is perfectly symmetric with respect to some plane 93, it can be exactly overlapped with region 94 for some angle φ. Once this maximizing problem has been solved the vector t can be calculated at any point 82 as the unit vector tangent to the free-form surface 81 at 82 and contained in the maximizing plane 93. This procedure enables the calculation of a vector field on the surface 81 and its integration into a family of curves that will be the guiding curves of the grooved reflector.

2) In a 3D SMS (Simultaneous Multiple Surface) design (as described in U.S. Pat. No. 7,460,985 to Benitez et al.) there is a simplified procedure to calculate guiding curves. In this design procedure, two normal congruences of rays are used to design the optical surfaces once the "seed rib" on one of the surfaces is known (the "seed rib" is a curve on a surface, along with the surface normals at the points of the curve). A normal congruence of rays is a set of rays for which there is a family of surfaces normal to their trajectories, i.e., the wavefronts. Assume that $s_1(x,y,z)$ and $s_2(x,y,z)$ are the optical path lengths along each of these congruences, i.e., the equations $s_1(x,y,z)$=constant define the various wavefronts. Then, for most cases of interest, the guiding lines are the intersection of the mirror surface M with the family of surfaces defined by the equation $s_1(x,y,z)-s_2(x,y,z)$=constant.

3) As mentioned above in Section 2, in a Generalized Cartesian oval design the guiding curves can be calculated as the integral lines of the vector field $v_o(r)+v_i(r)$.

The choice of which of these guiding conditions to use depends upon the procedure used to design the entire optical system, as well as the application.

3.2 Design of the Groove

The angle θ(γ) is selected depending on the particular groove cross-section. In the case of a V-shaped cross-section this angle is chosen so the groove's local plane of symmetry is the aforementioned maximizing plane. The guiding curves C(α) together with the groove's cross-section J(s,n,θ(γ),γ), n and θ(γ) completely characterize the grooved reflector.

Consider the case when the grooved reflector is one face of a dielectric sheet with its other face being a surface parallel to the generic free-form surface 81. Assume that the sheet is thin enough that this parallel surface is effectively identical to the surface 81. In this case, the rays of the type 25 of FIG. 2a that do not follow the general law are not lost in a nonimaging application since they are still reflected within the bundle of rays connecting source and target. The same thing happens to the light undergoing Fresnel reflection at the parallel surface, i.e., this light is not lost because it follows the same trajectory as when 81 is a conventional reflector. For the remaining rays that are reflected by TIR, this grooved reflector sheet is potentially very efficient. Nevertheless there are still an important source of optical losses: first there are two reflections instead of the one of a conventional reflector. This means necessarily more sensitivity to surface roughness and surface errors. Second, the sheet thickness cannot be arbitrarily small. Selecting the sheet thickness must take into account the fact that the spacing of the grooves is related to it, so that the small thickness of the thin reflector approximation implies small groove spacing and thus more grooves per unit of surface, with a longer total groove length per unit of entry aperture surface. The corners (edges) of the grooves cannot be geometrically perfect, because the minimum radius achievable is non-zero, so there are optical losses the magnitude of which depends on the total length of the corners. Thus, an increased number of grooves means an increased number of corners and an increase of optical losses due to this effect. Moreover the spacing between the tips of the grooves and the entry aperture also affects the thin sheet approximation, and a ray impinging in a groove can be reflected towards another neighbor groove (for instance, rays such as 25 of FIG. 2a.

This reflector sheet can be as robust as the dielectric material of which it is made.

Figure 10A:
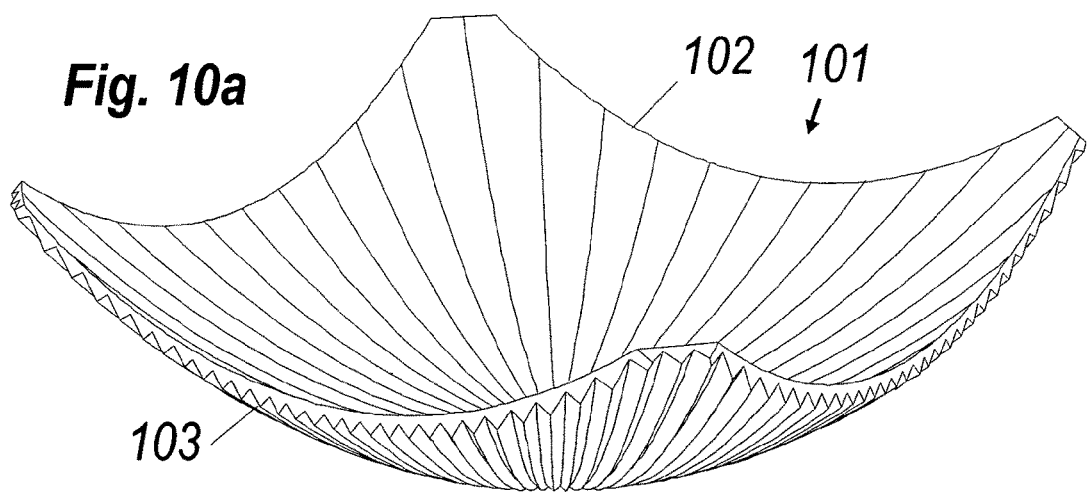
FIG. 10a shows a grooved reflector designed to substitute for a conventional reflector of an XR design of revolution.

FIG. 10a shows the grooved reflector 101 designed to substitute for a conventional reflector of an XR design of revolution as described in U.S. Pat. No. 6,639,733 to Miñano et al. and intended for solar photovoltaic applications. This conventional reflector is close to a parabolic shape (though not exactly parabolic). The entry aperture 102 is smooth. The V shaped grooves 103 are on the back side.

Figure 10B:
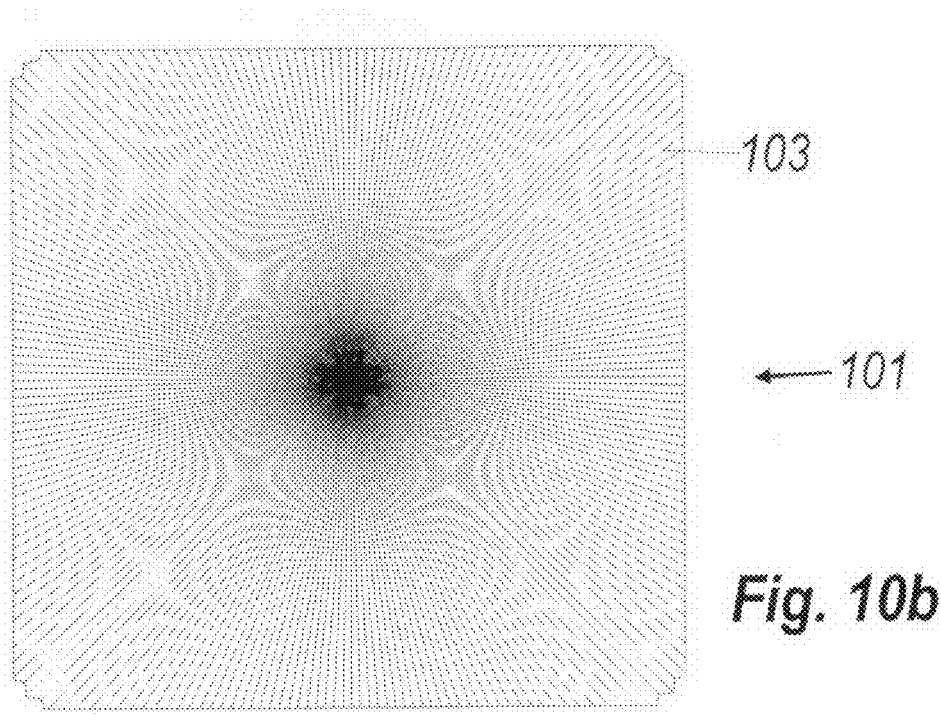

FIG. 10*b* is a view of the back side view of the same grooved reflector, showing that the guiding curves lie in meridian planes.

Figure 11A:
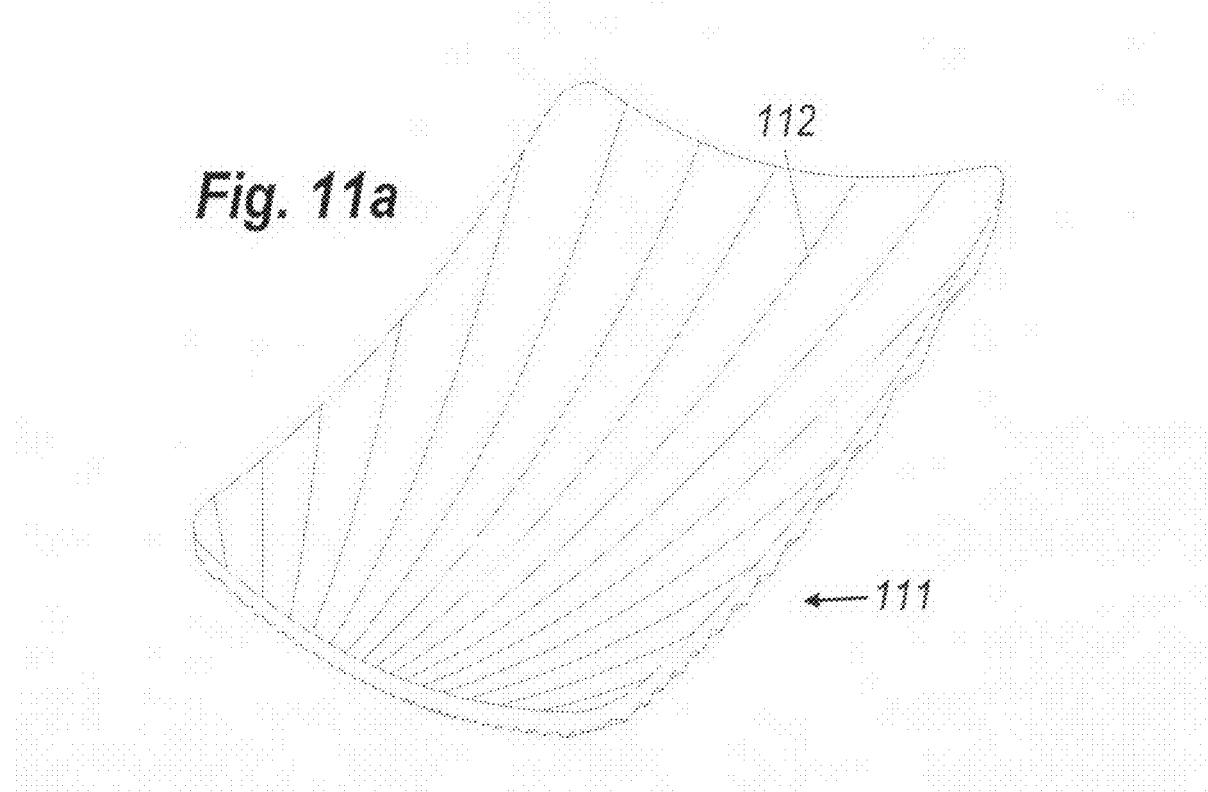
FIG. 11a shows a grooved reflector designed to substitute for a free-form reflector of an XR design.
Figure 11B:
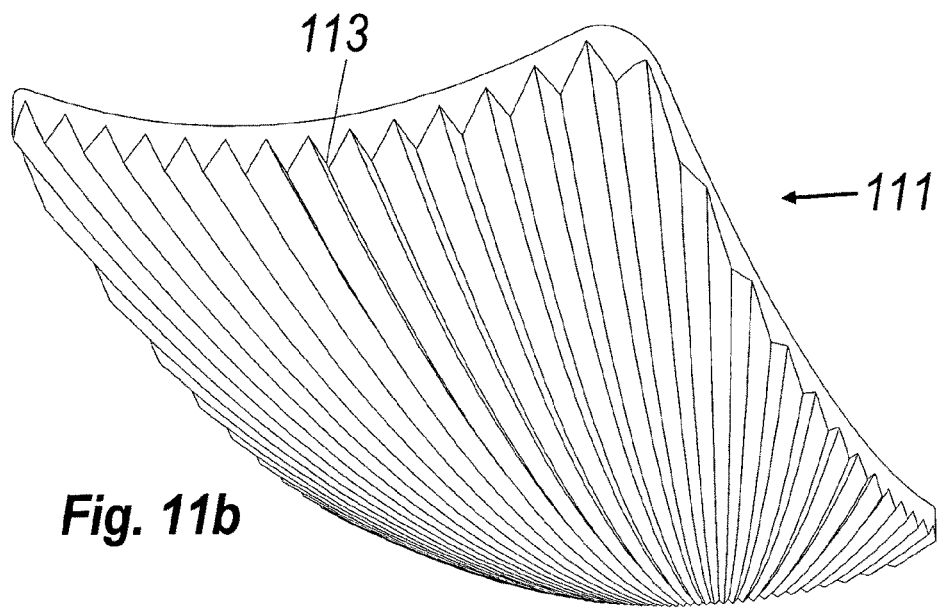

FIG. 11*a* shows the grooved reflector 111 designed to substitute for a free-form reflector of an XR design or of an XX (two reflections) design, such as those shown in U.S. Pat. No. 7,460,985 to Benitez et al., titled "Three-Dimensional Simultaneous Multiple-Surface Method and Free-form Illumination-Optics Designed Therefrom", see also U.S. patent application Ser. No. 12/075,830 filed Mar. 14, 2008 (publication no. 2008-0223443 A1) titled "Optical Concentrator, especially for Solar Photovoltaics". In this case, the guiding lines 112 are not necessarily contained in planes. The V shaped grooves 113 are on the back side and can be seen more clearly in FIG. 11*b*.

4. Guiding Curves Lying on Different Surfaces

The distance between adjacent guiding curves may vary along the curves. For instance, in a rotationally symmetric system with radial grooves, the guiding curves diverge when moving away from the axis. Consequently the size of the groove cross-section increases. This can be undesirable for several reasons: (a) the density of grooves is a trade off-between losses due to the rounding on the corners and the thin reflector approximation for those designs based on this approximation; (b) if the reflector is going to be made by plastic injection then it is desirable to have constant sheet thickness. To avoid this change of groove density, new grooves can be inserted between the original grooves along the parts of the original grooves that are relatively widely spaced. The ends of the new grooves can be an important source of losses if the new grooves are not generated properly. Next it is shown how to create new guiding curves with grooves intersecting with the old ones (and thus increasing the density of grooves), while simultaneously generating no new losses.

Consider replacing a conventional reflector M by a grooved one. Choose a normal congruence of rays C that represents the rays of interest in a particular application. For instance, in an LED collimator design the rays of interest might be taken to be those issuing from the central point of the LED chip.

Designate as $C_b$ and $C_a$ the set of rays before and after the reflection on the mirror M. The mirror transforms the set of rays $C_b$ into $C_a$, or, to restate, the mirror M is a reflective solution of the Generalized Cartesian oval problem of coupling the sets of rays $C_b$ and $C_a$. It is not the only solution, however. Different optical path lengths from $C_b$ to $C_a$ give different mirrors that are akin to parallel sources.

Let $M_1$ be one of these other mirrors (it is preferable to choose one near M). Now substitute $M_1$ for the original mirror M and trace the rays of interest through the new system and calculate new guiding curves on $M_1$ as explained in Section 3.1 above. This procedure can be repeated to obtain guiding curves on different reflective solutions $M_i$ of the Generalized Cartesian oval problem.

Now create the grooves with the guiding curves on M, as explained in Section 3.2. In the regions where the guiding curves on M diverge, the curves intersecting adjacent grooves (the groove edges) will separate from M. With sufficient separation, these curves will intercept $M_1$. Next calculate the points where these curves intercept the surface $M_1$ and take the guiding curves on $M_1$ that pass through these points. Create the corresponding grooves and intersect them with the ones generated from M.

Figure 12:
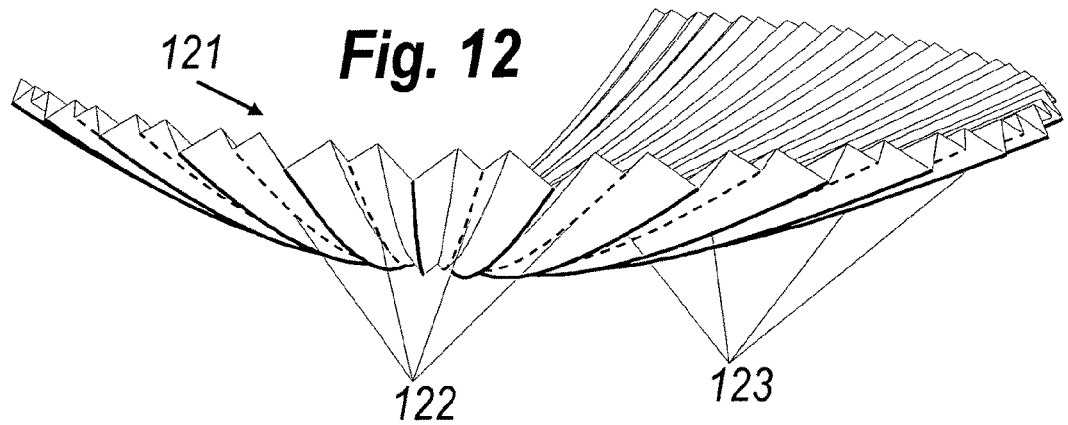
FIG. 12 shows a grooved reflector with two-level grooves generated from guiding curves lying on two reference surfaces.
Figure 13:
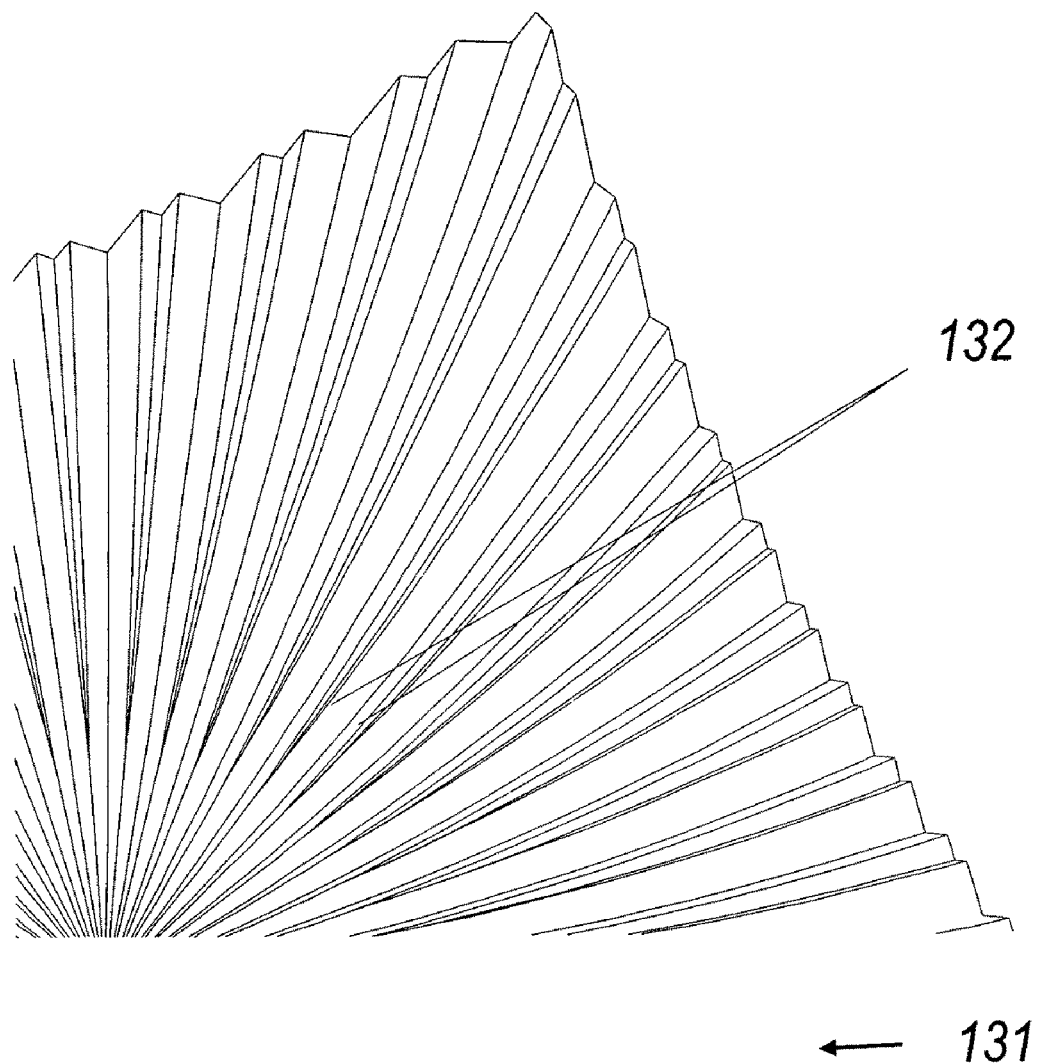
FIG. 13 shows another two-level grooved reflector showing some points where groove edges generated from a first reference surface intercept on, and initiate, guiding curves on a second reference surface.

FIG. 12 shows the grooved reflector 121 with grooves generated from guiding curves 122 laying on M and grooves with guiding curves 123 laying on $M_1$. FIG. 13 shows another two-level grooved reflector 131 showing some points 132 where the groove edges generated from M intercept the surface $M_1$ and consequently initiates the guiding curves on $M_1$.

5. Types of Groove Cross-Sections

The 90° V-shaped groove is just one possible profile. In general this profile only works well when the groove cross section is small compared with the size of the source or the target.

Further strategies follow to define groove cross-sections:
5.1 SMS 2D Designs with Series Expansion at Vertex Two different SMS 2D design problems are considered next. The first one (Type I) is stated as follows: Two wavefronts in 2D geometry are given such that there is an associated ray common to both (i.e., the ray trajectory that is perpendicular to both wavefronts), with a point along that ray trajectory also specified. In this section, the design problem is to design two mirrors such that the rays of one of the wavefronts become rays of the other wavefront after a reflection at each of the surfaces (either one first). The two mirrors meet at the prescribed point. This design will have direct application to the design of the Cartesian oval type grooved reflectors described above.

The second design problem (Type II) is stated as follows: Two wavefronts in 2D geometry and a point are prescribed. The point is such that the rays of the specified wavefronts do not coincide as they pass through that point. Two mirrors must be designed such that the rays of any of the wavefronts become reverse rays of the same wavefront after successive reflections by each of the surfaces. The two mirrors meet at the prescribed point. This design will have direct application for the design of cavities discussed in Section 9, "CAVITIES WITH GROOVED REFLECTORS" below.

Both design problems (Types I and II) are closely related when the SMS method is used. Type II is first described in detail, and Type I is described by highlighting particular changes to the procedure for Type II.

Figure 14:
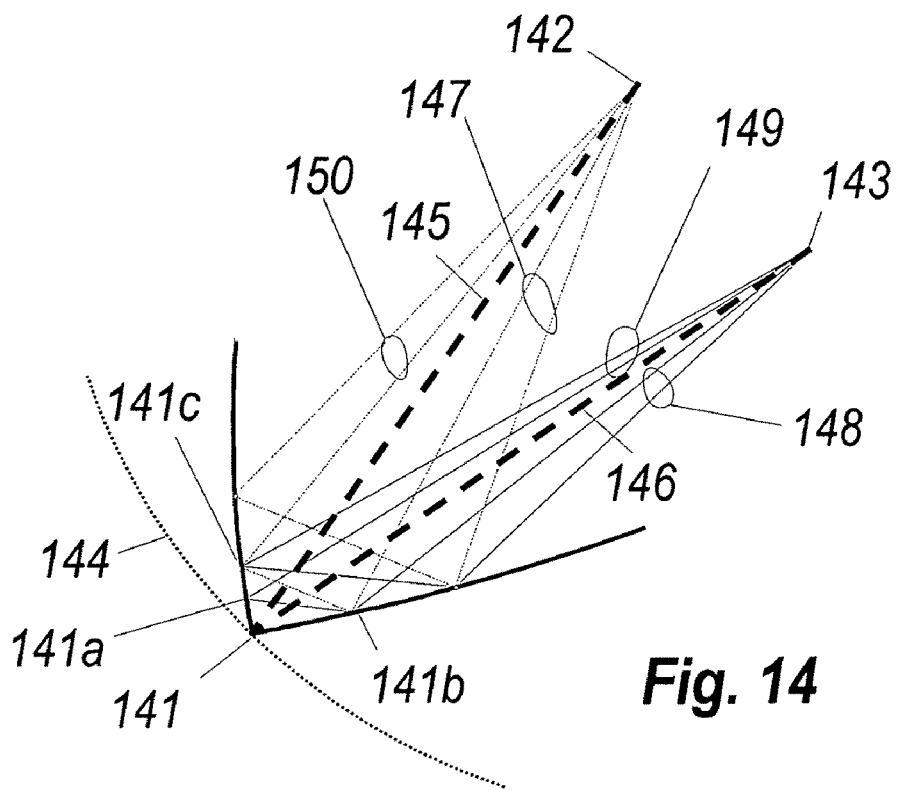
FIG. 14 shows a cross-section through an embodiment of a retro-reflector profile.

FIG. 14 shows an example of a Type II design problem, in which the two wavefronts are any two circles with centers at the points 142 and 143, for instance the circles of radius zero. The specified point is 141, which fulfills the requirement that it is not aligned with wavefronts 142 and 143. If the problem was to design a single reflector, the solution would be the canonical Cartesian oval problem: its solution is the ellipse 144 with foci at 142 and 143. In the present case, however, two deflections are required.

Consider the rays 145 and 146 passing through the point 141 and belonging one to each wavefront 142, 143. Divide each wavefront into two sets at the point where the rays 145 or 146 hit the wavefront. More exactly, divide each bundle into rays defined by each wavefront, to obtain bundles 147, 148, 149 and 150. Designate as input bundles the two bundles the rays of which pass to the right of point 141 (i.e., bundle 147 from wavefront 142 and bundle 148 from wavefront 143) and designate the remaining ones as output bundles, (i.e., bundle 150 from wavefront 142 and bundle 149 from wavefront 143).

Consider an SMS 2D system with 147 and 148 as input bundles, 149 and 150 as output bundles, the bundle 147 being transformed into 150, and bundle 148 into 149 after the two reflections, selecting the optical path lengths such that the two mirrors pass through 141. FIG. 14 shows an example. The design procedure is as follows:

1). Calculate the optical path length from each input bundle to its corresponding output bundle. This is simple since we know that both deflecting curves (both mirrors in the example) meet at the point 141, where both reflections occur for the rays 145 and 146 reaching it. For instance the optical path length from a wavefront of bundle 147 (take the point 142 as this wavefront) to a wavefront of the bundle 150 (take the same point as wavefront) is simply twice the optical path length from 142 to 141.

2). Calculate the normal vector of the mirrors at point 141. Note that since the bundle 147 is transformed into 150, this means that the ray coming from 142 must be reflected back to the same point. A similar result obtains for point 143. For this to be fulfilled at the point 141 it is necessary that the normal vectors to the two mirrors be orthogonal (as in a conventional linear retro-reflector). This is simple to prove: let $v_{142}$ be the unit vector of the ray coming from point 142 to 141, and let $n_1$ and $n_2$ be the two normal vectors to the mirrors at 141. The ray vector after reflection by either surface must coincide, i.e., $v_{142} - 2(n_1 \cdot v_{142})n_1 = -v_{142} + 2(n_2 \cdot v_{142})n_2$ (the reflection law has been used). This equation can be re-written as $v_{142} = (n_1 \cdot v_{142})n_1 + (n_2 \cdot v_{142})n_2$ which compared with the decomposition of the vector $v_{142}$ in terms of the vectors $n_1$ and $n_2$ reveals that the only condition to fulfill is that $n_1$ and $n_2$ be orthogonal. Fortunately, this is the same condition needed when considering the bundles 148 and 149 and the ray unit vector $v_{143}$ coming from 143. Then one of the normal vectors can be chosen, for instance $n_1$, thus fixing the other. In general $n_1$ and $n_2$ are chosen to maximize the power that is reflected by TIR and to minimize losses due to the finite size of the grooves, which results in $(n_1 + n_2)$ being parallel to $(v_{142} + v_{143})$.

3). Starting the SMS 2D procedure requires a point on one of the two mirrors and the normal of the mirror at that point. Although the point 141 belongs to both mirrors, it is unfortunately a point of convergence so that the SMS procedure cannot progress from there, and a further point is required. It can be obtained by considering the solution that admits a series expansion of one of the mirrors at the point 141 (so that the mathematical function defining the profile is said to be analytic around point 141). From the practical point of view it suffices to obtain the neighboring point 141a by means of a linear approximation of the mirror profile near the point 141. This other point 141a can be as close as necessary to 141, i.e., we can choose it close enough so the linear expansion is a good approximation of the mirror profile.

4). Reflect the ray from 143 on starting point 141a and calculate the point 141b along that reflected ray that matches the optical path length again towards 143 after the second reflection at 141b. Compute the normal vector at 141b consistent with the ray trajectory from 141a to 141b to 143.

5). Analogously, reflect the ray from 142 at 141b and calculate the point 141c along that reflected ray that matches the optical path length again towards 142 after the second reflection at 141c. Compute the normal vector at 141c consistent with the ray trajectory from 141b to 141c to 142.

6). Repeat the calculations of steps 4) and 5), using 141c as a starting point and so on, to obtain sequences of points on both mirrors that are separate from point 141.

7). Interpolate a smooth curve between points 141a and 141c, with the additional condition that the normal vector to that curve at the edges coincides with the normal vectors at 141a and 141c. Since the point 141a was selected very close to 141, the distances from 141 to 141b and from 141a to 141c can also be expected to be small, so that the interpolating curve can have a small arc length relative to the practical facet size.

8). Repeat the calculations of steps 4), 5) and 6) using the points of the interpolating curve as a starting point. This calculation will provide the intermediate points between the points of the sequences started at 141a and 141b.

Regarding the Type I design problem described above, FIG. 15 shows an example in which the two wavefronts are any two circles with centers at the points 152 and 153, for instance the circles of radius zero. The ray common to both wavefronts has trajectory 155, and the specified point is 151. The Type I design problem is to design two mirrors such that the rays of one of the wavefronts become rays of the other wavefront after two reflections by each one of the surfaces (regardless of order). The two mirrors meet at the prescribed point.

The design procedure is essentially the same as described for Type II. Divide each bundle of rays associated with the wavefronts into two sets, bounded by the common ray 155. thus ray bundles 157, 158, 159 and 156 are obtained to play the role of bundles 147, 148, 149 and 150, respectively, in the Type II problem described in FIG. 14. Similarly, points 151a, 151b and 151c are analogous to 141a, 141b and 141c.

Two limit cases of both SMS design problems Type I and II are remarkable. First, when points 152 and 153 converge with each other to a single point and the normal vectors at 151 are symmetric with respect to the ray 155, the SMS 2D calculation converges to two confocal symmetric parabolas passing through 151 and with their axes perpendicular to the straight line 151-152. These confocal symmetric parabolas have been suggested as a retroreflector for instance, by Ralf Leutz, Ling Fu, and Harald Ries, "Carambola optics for recycling of light", Applied Optics, Vol. 45, Issue 12, pp. 2572-2575. Second, when points 142 and 143 (analogously 152 and 153) are taken to infinity along the same direction, the former SMS 2D calculations leads at that limit to the conventional right angle flat-facet retroreflector discussed above. Therefore, in these particular cases flat profiles and parabolic profiles turn out to be exact solutions of the SMS 2D design problem, with analytic profiles around point 141.

5.2 Parabolic Cross Sections

In general, the SMS 2D design of the previous section leads to aspheric profiles. If the facet is small enough, however, the profiles can be approximated by a low order truncation of the series expansion. The first-order approximation is just the right-angle flat-facet corner discussed above. The second order approximation means that the mirrors are approximated by parabolas (or, alternatively, by circumferences) and bigger facets than the flat-facet profiles can be used for the same optical performance.

This second-order approximation can be obtained calculating the mirror curvature radii (or equivalently, the second derivatives of the profiles), at the point 141 for Type II designs and point 151 for Type I. The relationship between the radius of curvature $\rho_i$ of an incident wavefront, the radius of curvature $\rho_r$ of the reflected wavefront, and the radius of curvature $\rho_m$ of the mirror at the point of reflection is $\cos(\alpha)(1/\rho_i - 1/\rho_r) = 2/\rho_m$, where $\alpha$ is the incidence angle between the normal to the surface and the reflected ray. The wavefront curvatures are taken as positive if the bundle is diverging and the mirror curvature is positive when the mirror is convex. Applying this relationship to the bundles 147 148, 149 and 150 at point 141 gives a solvable four-equation linear system the unknowns of which are the inverse of the radii of curvature of the two mirrors at the same point 141, and the inverse of the radius of curvature of the bundles between both reflections. Note that the absolute value of the radius of curvature of the bundle 147 is equal to that of 150. The same thing happens for the bundles 148 and 149.

As an example, consider the case of the Type II design in which points 141, 142 and 143 are collinear and 143 is placed at infinity. If the normal vectors at 141 are symmetric with respect to the straight line joining 141 and 142 (so α=π/4), the SMS solution will be symmetric with respect to that line, so that the second-order approximation will work. Therefore, the four linear equations reduced to these two:

$$\left(\frac{1}{\sqrt{2}}\right)\left(\frac{1}{\rho_i} - \frac{1}{\rho_{int}}\right) = \frac{2}{\rho_m} \quad (1)$$

$$\left(\frac{1}{\sqrt{2}}\right)\left(\frac{1}{\rho_{int}}\right) = \frac{2}{\rho_m}$$

where $\rho_i$ coincides with the distance between 141 and 142, so that $\rho_m = \sqrt{32}\rho_i$.

The equation of the approximating parabola is thus given by:

$$z = \tan(\alpha)y + \frac{(1+\tan^2(\alpha))^{3/2}}{2\rho_m}y^2 = y + \frac{1}{4\rho_i}y^2 \quad (2)$$

Figures 16A, 16B:
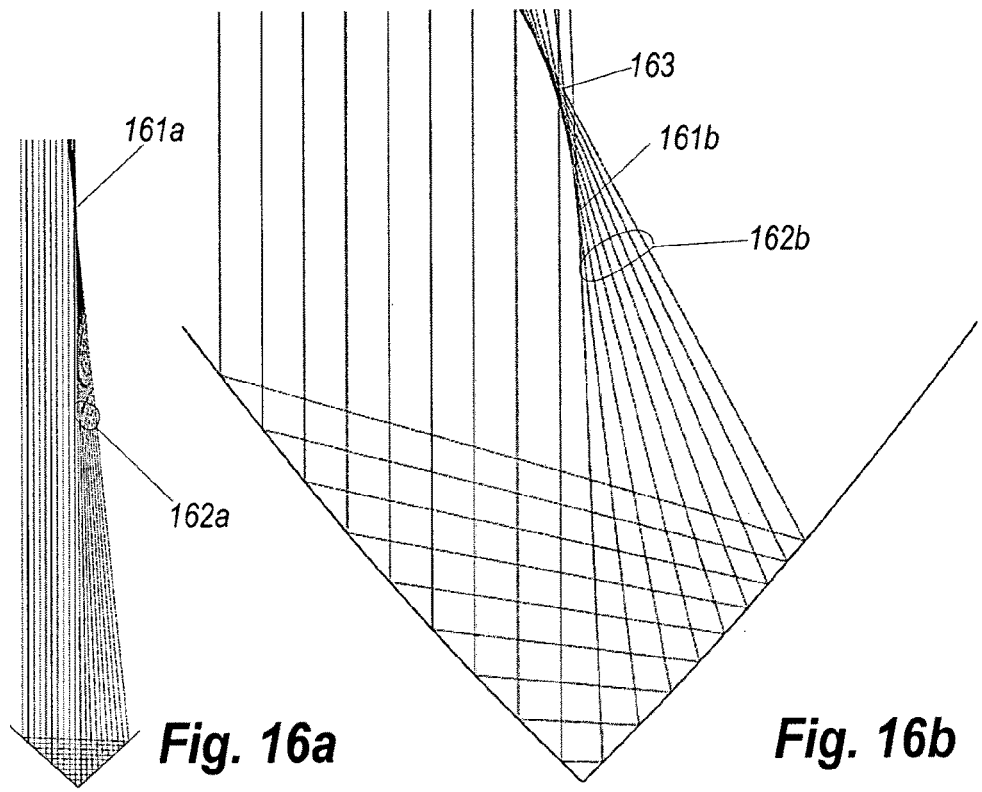
FIG. 16a shows the ray-trace on a parabolic approximation on a design similar to that of FIG. 15.
FIG. 16b shows the ray-trace on the same design as in FIG. 16a but for a larger angular half-span of the rays of the spherical wavefront.

FIG. 16*a* shows a ray trace of this design. Note that in this design the symmetric parabolas are not confocal, and nor is the focus of either of them at the primary focal point 161*a*. The parabolic approximation is good in this example if the half-angle 162*a* subtended by the retroreflector from the point 161*a* is about 5° full angle or less. For a larger angle 162*b* (see FIG. 16*b*) the rays no longer converge onto the small-angle focal point 161*b*, instead forming a caustic. For these greater angles, a higher-order polynomial approximation or the exact SMS 2D profile should be used instead.

5.3 Designs without Vertex Convergence

In the previous designs, a ray impinging on one mirror infinitesimally close to the vertex is secondly reflected on the other mirror similarly close to the vertex. However, we can also build other families of solutions in which that condition does not apply.

Figure 17:
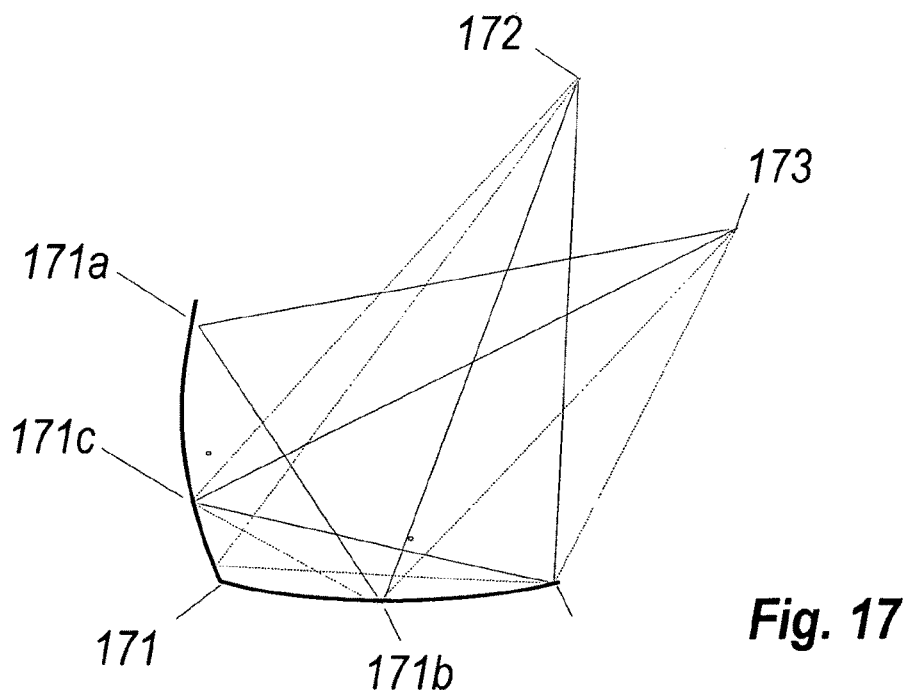
FIG. 17 shows an SMS2D retro-reflector profile whose function is similar to that of FIG. 15 in which convergence at the groove corner is not possible.

In the framework of the SMS 2D designs discussed before, let us consider a third SMS 2D design problem (Type III) which is stated as follows: Two wavefronts in 2D geometry are given and a point is given such that the two rays associated to the wavefronts passing through that point are not coincident. Our design problem is to design two mirrors that meet at the prescribed point such a point so the rays of one of the wavefronts become rays of the other wavefront after reflections in the two surfaces in either order. FIG. 17 shows an example of this type of problem in which the prescribed point is 171 and the two wavefronts are spherical centered at point 172 and 173. The sequence of points calculated by the SMS is in this case 171*a*, 171*b*, 171*c* and 171*d*.

The difference between this design problem Type III and the problem Type I described before is that in design Type I the two rays associated to the wavefronts passing through the meeting point of the reflector were coincident. That condition led to the result in Type I that the slopes of the two mirrors at that point form a 90° reflective corner (no matter how it is oriented), and the two reflections in that corner will transform the rays as desired. However, the condition of non-coincidence of the two rays at the corner in Type III leads to the result that there is no corner that produces the required ray-transformation. However, this does not prevent the SMS method from being applied.

Figure 18:
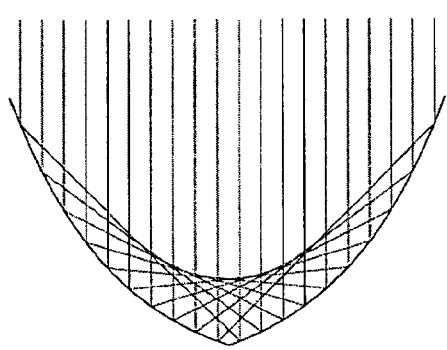
FIG. 18 shows the limit case of FIG. 17 for the two points coincident at infinity, which is the dual case of retroreflector of FIG. 1 with a real caustic inside the groove.

Analogously to cases I and II, there are also two limit cases of Type III SMS design problems that are remarkable. In the first of those cases, points 172 and 173 coincide, and the normal vectors of the reflectors at 171 are symmetric with respect to the ray linking 171 and 172. The particular case where such a point 172 (173) is located at infinity is shown in FIG. 18. The groove shown in FIG. 18 is calculated with the condition that a ray impinging vertically downwards on the point with coordinate x is, after the two reflections on the groove, sent back vertically at coordinate x+a, where a is a given quantity. This is in fact a dual of the groove of flat facets of FIG. 1 for which a ray impinging vertically downwards at the point with coordinate x is, after the two reflections on the groove, sent back vertically at coordinate a−x (where a is in this case the x coordinate of the vertex of the flat groove). That family corresponds to two mirrors in which there is a solution at the vertex. In this solution (as in that of FIG. 17) the reflected rays will cross inside the groove, forming a real (i.e., non-virtual) caustic.

The optical path length condition says:

$$-y_R + \sqrt{(2a)^2 + (y_R - y_L)^2} - y_L = 2a \quad (3)$$

So:

$$(2a)^2 + (y_R - y_L)^2 = (2a + (y_R + y_L))^2 \quad (3)$$

$$-2y_R y_L = 4a(y_R + y_L) + 2y_R y_L \quad (4)$$

$$y_R y_L + a(y_R + y_L) = 0 \quad (5)$$

$$y_L = \frac{-a y_R}{a + y_R} \quad (7)$$

The reflection law at B:

$$(0, 1) \cdot \left(1, \frac{dy_R}{dx}\right) = \frac{(2a, y_R - y_L)}{\sqrt{(2a)^2 + (y_R - y_L)^2}} \cdot \left(1, \frac{dy_R}{dx}\right) \quad (8)$$

Using Equation (3) in Equation (8):

$$\frac{dy_R}{dx}(2a + y_R + y_L) = 2a + (y_R - y_L)\frac{dy_R}{dx} \quad (6)$$

$$\frac{dy_R}{dx} = \frac{a}{a + y_L} \quad (7)$$

And substituting Equation (7):

$$\frac{dy_R}{dx} = 1 + \frac{y_R}{a} \quad (8)$$

$$\frac{dy_R}{a + y_R} = \frac{dx}{a} \quad (9)$$

$$Ln(a + y_R) = \frac{x}{a} + b \quad (10)$$

Since $y_R=0$ for $x=a$:

$$b = Ln(a) - 1 \qquad (11)$$

$$y_R + a = ae^{\left(\frac{x}{a}-1\right)} \qquad (12)$$

Thus by Equation (7):

$$y_L + a = ae^{-\left(\frac{x}{a}+1\right)} \qquad (13)$$

The height of the groove is:

$$y_R(x=2a) - y_R(x=0) = -a + ae - \left(-a + \frac{a}{e}\right) = a\left(e - \frac{1}{e}\right) \qquad (14)$$

Better coordinates are obtained by translation and scaling so:

a=e

X=x

Y=y+a  (15)

So the full profile is given by:

$$Y = e^{|X|/e} \qquad (16)$$

whose aperture is 4e and its height is $e^2-1$.

The full angle at the bottom is 2a tan(1/e)=139.6°, to be compared with the 90° of the normal inverting retroreflector. In an array, the full angle at the top is then 2a tan(e)=40.4°, to be compared with the 90° of the normal inverting retroreflector.

Figure 19:
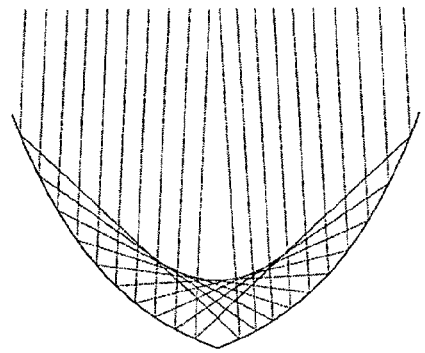
FIG. 19 shows that retroreflector of FIG. 18 does not retroreflect exactly parallel rays with tilt angle $\alpha$>0 as expected.

FIG. 19 shows that this retroreflector does not retroreflect exactly parallel rays with tilt angle α>0 as expected, since it is designed as aplanatic for α=0 (i.e., 172 and 173 coincident at infinity). To exactly retroreflect the rays of α>0, the SMS design method Type III of FIG. 17 is applied with 172 and 173 not coincident at infinity (separated by the design angle 2α).

5.4 SMS 2D Design with Cartesian Ovals at the Rim

Figure 20A:
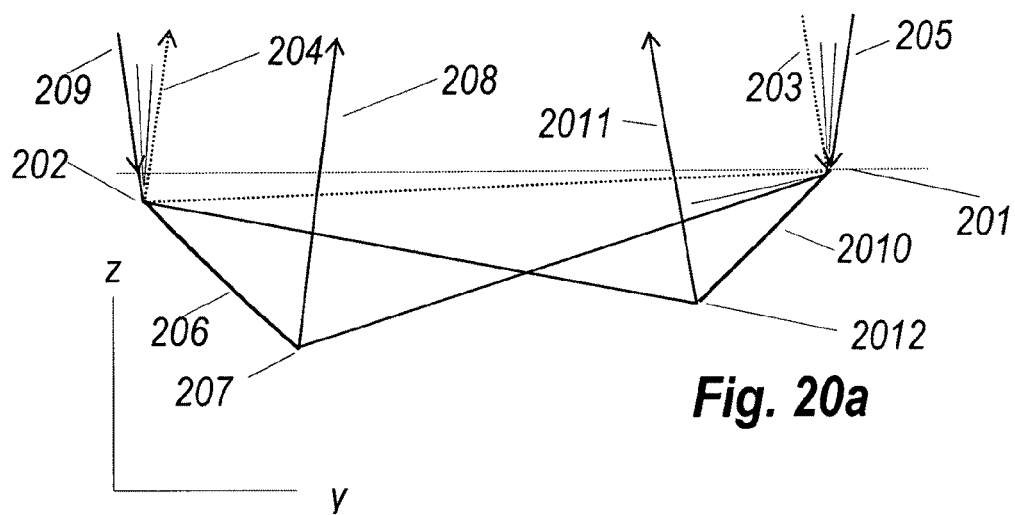
FIG. 20a shows the first steps in the construction of the SMS2D retroreflector with Cartesian ovals at the edges.
Figure 20B:
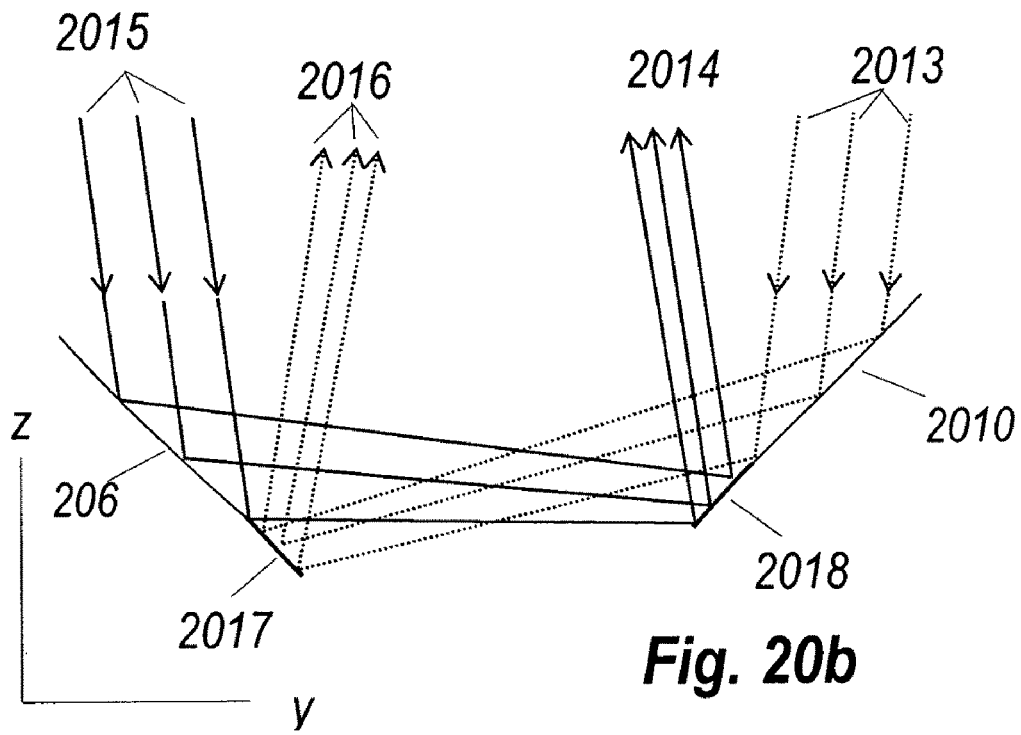

As mentioned before, Type I and Type III SMS designs can be done to retro-reflect the rays impinging on the groove with incident angles±α with respect to the symmetry line of the groove (Type I shown in FIG. 14, and Type III in FIG. 17, where 142, 143, 172 and 173) must be located at infinity). As a consequence of the Edge Ray Theorem of Nonimaging Optics, the rays inside±α will be retroflected also inside±α. However, Type I and Type III SMS designs will not transform all the rays impinging within angles±α onto themselves, because some rays will miss the reflection at the edges. In order to avoid such losses, the SMS2D design method can be applied for the groove design with the edge ray assignment shown in FIG. 20a and FIG. 20b. This problem can be called the Type IV problem. In this case, not only rays tilted±α (as 208 and 2011) play a role in the design, but also the ray fans passing through the groove edges 201 and 202. This design is started at the groove edges 201 and 202 building the two Cartesian ovals 2010 and 206 (parabolas in this case in which the wavefronts are generated by points at infinity) that focus the ray fans passing reflected at the groove edges 201 and 202 towards the rays of the prescribed wavefronts (parallel to 208 and to 2011, respectively, in this case). Rays 204 and 203 are mutually retroreflected, and edge rays 209 and 205 mark the rims 2012 and 207 of the Cartesian ovals. FIG. 20b shown the next steps in the calculation of the groove profile. The new portion 2017 is calculated with the condition that the rays 2013 (tilted+α) reflected on the known portion 2010 are transformed into rays 2016 (tilted−α). Analogously, new portion 2018 is calculated with rays 2015 and 2014. The process is repeated, advancing the profiles until they come close. Convergence, although not needed in practice (manufacturing the tip will need some radius) may occur but the profiles will not be analytic at the convergence point.

5.5 Kohler Integration

The Kohler integration is done with the two mirrors of the groove in the same way as disclosed in Patent Application No. WO 2007/016363 A2 by Miñano et al. The profiles will be composed by sections of Cartesian oval pairs forming a fractal-type groove. For the example of the points at infinity, the Cartesian oval pairs will be approximately parabolas that will scale down when getting closer to the groove corner.

6. Combination of Grooves and Lenses 6.1 Minimizing Vertex Rounding Losses

Figure 21:
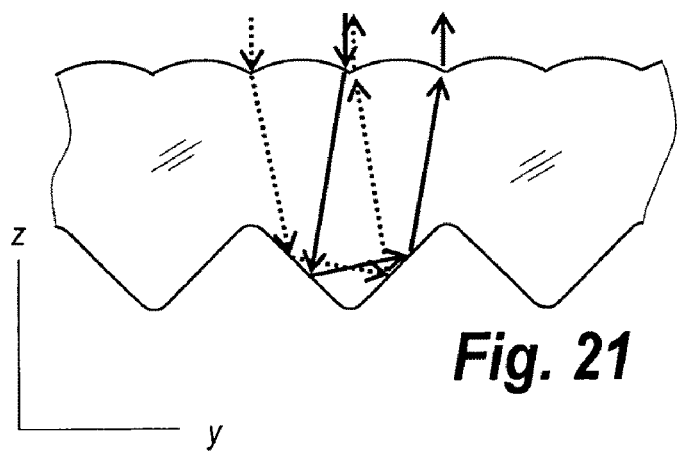
FIG. 21 shows a combination of positive lenses with essentially flat grooves so little or no light is reflected towards the groove corners.

The finite radius of the tips of the grooves when manufactured causes ray losses. In order to minimize this negative rounding effect, FIG. 21 discloses the combination of positive lenses with essentially flat grooves so no light is reflected towards the groove corners. Since the angle of the lens joints is much greater than the angles of the grooves, the finite radius losses introduced by the lens joints are much smaller.

Figure 22:
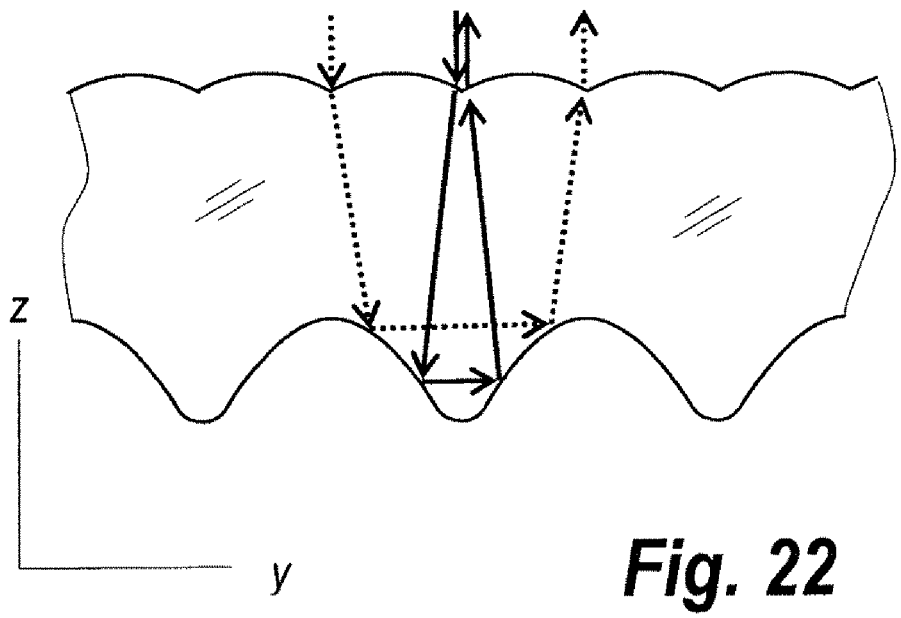
FIG. 22 shows an alternative design in which the grooves are concave enough to reverse the sign of the magnification of the system.

FIG. 22 discloses an alternative design in which the grooves are convex towards the light side (concave towards the mechanical outside) enough to reverse the sign of the magnification of the system. The profiles of these groove designs can be calculated with the methods described before.

6.2 Kohler Integration

Figure 23:
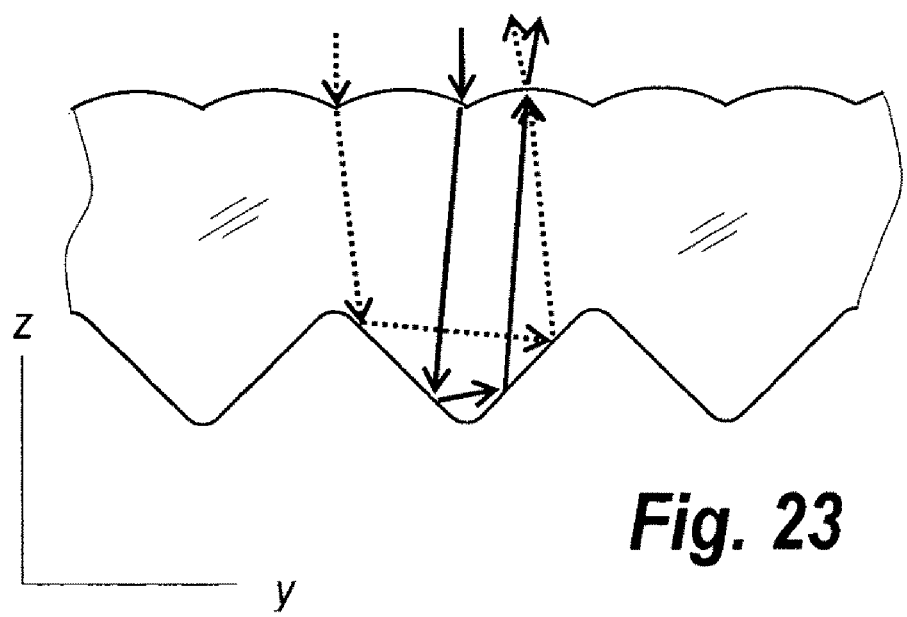
FIG. 23 shows a retroreflector with Kohler integration by lenses on the groove cover where there are two microlenses per groove.
Figure 24:
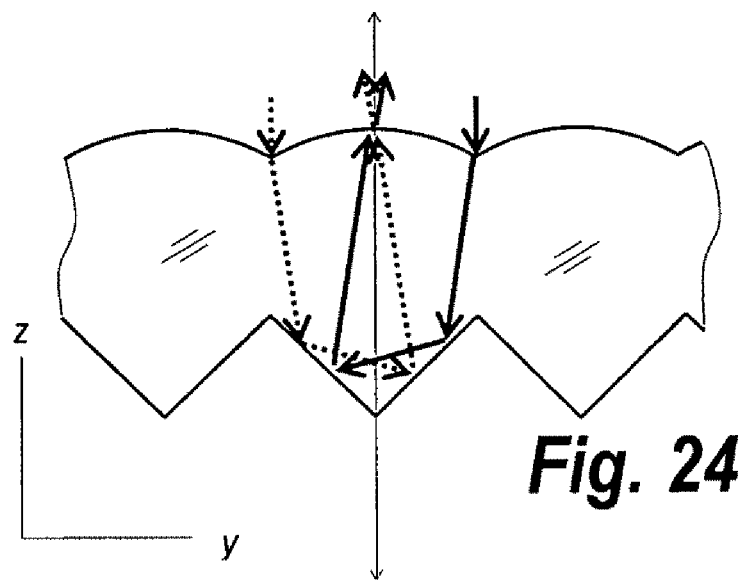
FIG. 24 shows a retroreflector with Kohler integration by lenses on the groove cover where there is one microlens per groove and the apex of the microlens is in line with the valley of the groove.
Figure 25:
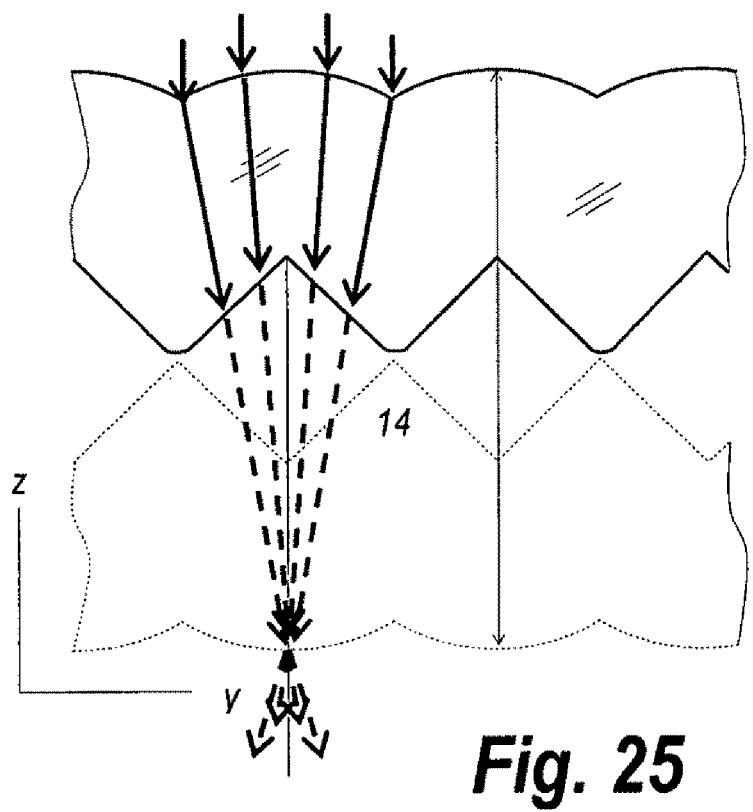
FIG. 25 shows a retroreflector with Kohler integration by lenses on the groove cover where there is one microlens per groove and the apex of the microlens is in line with the apex of the groove.

The Kohler integration can be done with the lens added on the groove cover. There are three particular cases with special interest. The first one is shown in FIG. 23, where there are two microlenses per groove. The second one is shown in FIG. 24, and in this case there is one microlens per groove and the apex of the microlens is in line with the valley of the groove while in the other case (FIG. 25), the apex of the microlens is in line with the apex of the groove. The acceptance angle of the incoming radiation for which TIR is achieved in both reflections is increased in a configuration of the first type. The configuration shown in FIG. 25 is more interesting than the one in FIG. 24 to decrease the losses due to the rounding of the corners. In plastic molding techniques, the corners are not perfectly reproduced. There is a rounding effect. The corners get a minimum radius. If the corner is mechanically convex (the angle inside the dielectric material is less than 180 deg) the minimum radius with current commercial plastic molding techniques is in the range of 15 microns. If the angle is concave the minimum radius is smaller (about 5 microns). The FIG. 25 configuration avoids sending radiation to the convex corners until the incidence angle of the incoming radiation is close to the acceptance angle limit. In this way, the losses due to the rounding of the convex corners do not affect the rays arriving perpendicular (or close to it) to the array. FIG. 25 illustrates how the single sheet of lenses forms a Kohler integrator by depicting in phantom lines the grooves and lenses, as they appear as virtual images in the reflecting groove surfaces. The light rays are correspondingly depicted as straight rays crossing the reflective surface into the virtual realm.

7. Free-Form Grooves with Non-Flat Cross Section

Let us consider now the design of a grooved parabolic reflector similar to the one described in FIGS. 10a and 10b but using large non-flat cross sectional groove profiles. The reasoning and analysis provided above can be easily extrapolated for the design of other general reflectors.

Figure 9:
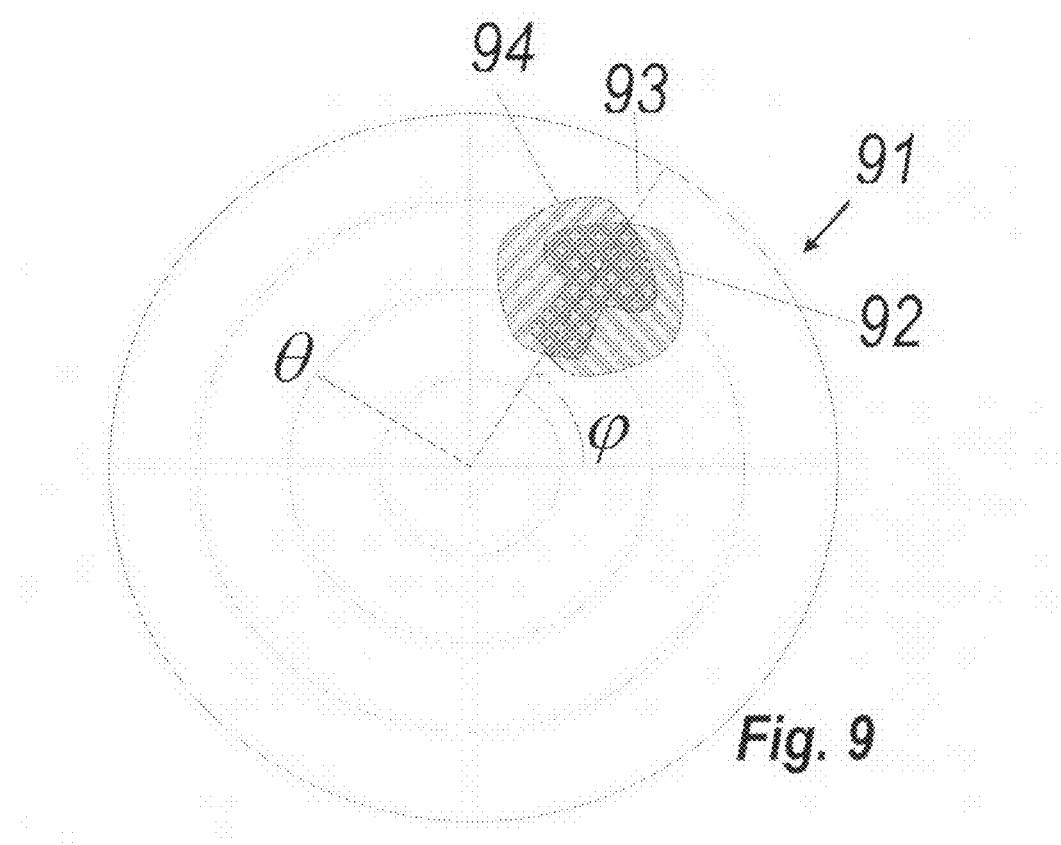
FIG. 9 shows the solid angle cone of FIG. 8 represented in a plane of $\phi$–$\theta$ coordinates.
Figure 26:
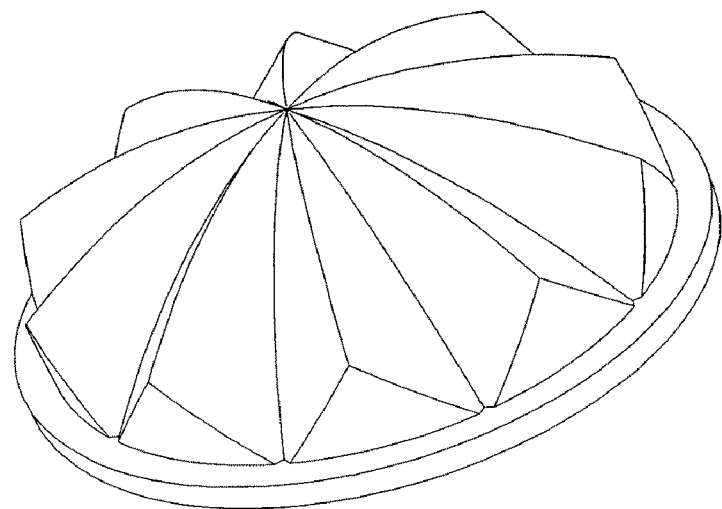
FIG. 26 shows a grooved parabolic reflector similar to the one described in FIGS. 10a and 10b but made of 10 free-form groove reflectors with large non-flat cross sectional profiles.

FIG. 26 shows such a design with 10 free-form grooves. This number of grooves is one with which, for a material with n=1.5, all the design rays undergo TIR. Other designs, such as those composed by 4 and 8 reflectors, need metallization if efficiency is to be optimized, but are also interesting for square emitters, because the guiding lines can all lie on planes of symmetry of a square, and thus the symmetry condition indicated in FIG. 9 is fulfilled. Such symmetry allows the emission intensity to remain approximately square. Of course, the same applies for a square receiver and its angular sensitivity.

The groove design can be done with two methods: a first one in which the solution is approximated as a sequence of 2D designs (preferably SMS2D designs, as described in the previous sections) along the groove, and the second one in which the calculation is done directly in 3D with the SMS3D method described in U.S. Pat. No. 7,460,985 to Benitez et al.

7.1 Sequence of 2D Designs Along the Groove

Figure 27:
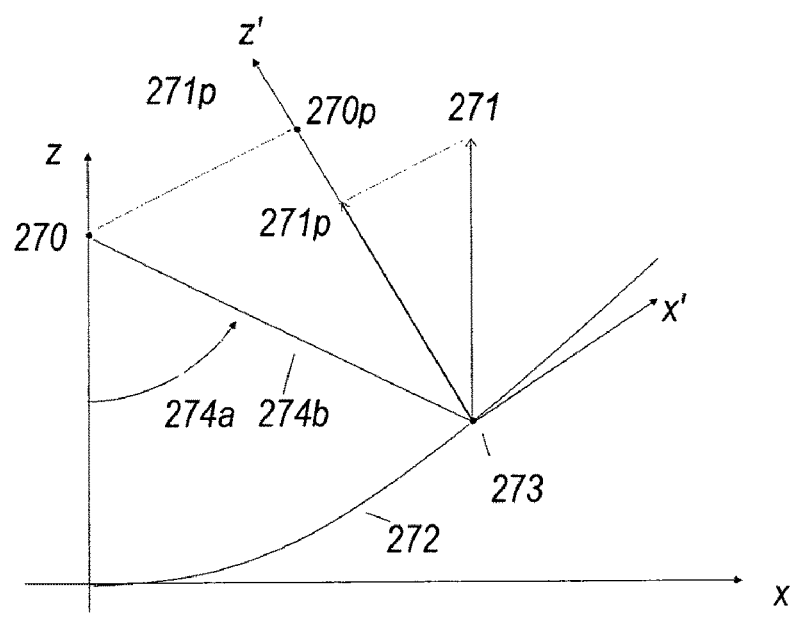
FIG. 27 shows the design of a large groove as a sequence of 2D designs along the groove.

Referring to FIG. 27, consider that in this example all the rays of focal point 270 are going to be collimated parallel to direction vector 271, which will be equivalent to a focal point located at infinity. Consider the parabola 272 as guiding curve for the groove. Without loss of generality, consider that parabola 272 is located in meridian plane y=0 and x>0, so its equation can be written in polar coordinates as $r(\theta)=2f/(1+\cos(\theta))$, where $\theta$ is angle 274a and $r$ is distance 274b. For every value of the parameter $\theta$, we can calculate the plane perpendicular to the parabola 272 at the point 273 defined by $(\theta, r(\theta))$. The local axes of that perpendicular plane are y'–z'. We can compute the projection of point 270 and direction vector 271 on plane 274 which gives point 270p, and direction vector 271p, respectively. The distance between points 273 and 270p is $a(\theta)=r(\theta)\cos(\theta/2)$.

The intersection of the groove with the plane y'–z' is then designed inside that plane as a 2D design to focus point 270p and direction vector 271p. If the groove has equation $z'=f(y', a(\theta))$, then the free-form surface equation of the groove for y>0, x>0 lying on guiding curve 272a can be expressed as:

$$x(\theta, y') = r(\theta)\sin(\theta) - f(y', a(\theta))\sin\left(\frac{\theta}{2}\right) \quad (17)$$

$$y(\theta, y') = y'$$

$$z(\theta, y') = f - r(\theta)\cos(\theta) + f(y', a(\theta))\cos\left(\frac{\theta}{2}\right)$$

The cross sectional 2D designs are the parabolic approximations given by equation (2), the free-form equation of the groove facet in the x>0, y>0 region is given by:

$$x(\theta, y') = r(\theta)\sin(\theta) - \left(y' + \frac{1}{4a(\theta)}y'^2\right)\sin\left(\frac{\theta}{2}\right) \quad (18)$$

$$y(\theta, y') = y'$$

$$z(\theta, y') = f - r(\theta)\cos(\theta) + \left(y' + \frac{1}{4a(\theta)}y'^2\right)\cos\left(\frac{\theta}{2}\right)$$

Substituting $a(\theta)$ and $r(\theta)$:

$$x(\theta, y') = \frac{2f}{1+\cos(\theta)}\sin(\theta) - \left(y' + \frac{\cos\left(\frac{\theta}{2}\right)}{4f}y'^2\right)\sin\left(\frac{\theta}{2}\right) \quad (19)$$

$$y(\theta, y') = y'$$

$$z(\theta, y') = f - \frac{2f}{1+\cos(\theta)}\cos(\theta) + \left(y' + \frac{\cos\left(\frac{\theta}{2}\right)}{4f}y'^2\right)\cos\left(\frac{\theta}{2}\right)$$

The rest of facets are obtained by applying the corresponding symmetries (dividing the circle into 20 sectors with a plane of reflection every π/10 radians for the 10 groove design).

If, instead of using the approximate 2D design of equation (2), one of the exact SMS 2D designs of section 5 can be used, the free-form surface will perform more accurately. The expression of $z'=f(y', a(\theta))$ will not have, in general, a close form in that case.

In the neighborhood of the parabola 272 any of the solutions is a good approximation, and this design converges to that of FIG. 10a and FIG. 10b when the number of grooves becomes sufficiently large.

7.2 Free-Form SMS 3D Designs

Figure 15:
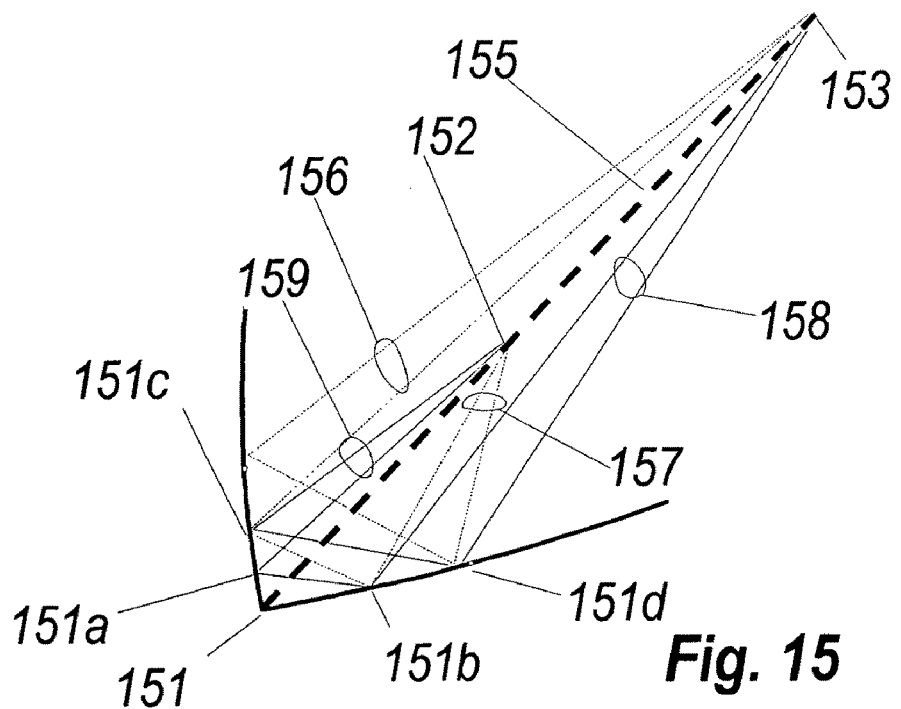
FIG. 15 shows a cross-section through another retro-reflector profile.
Figure 28:
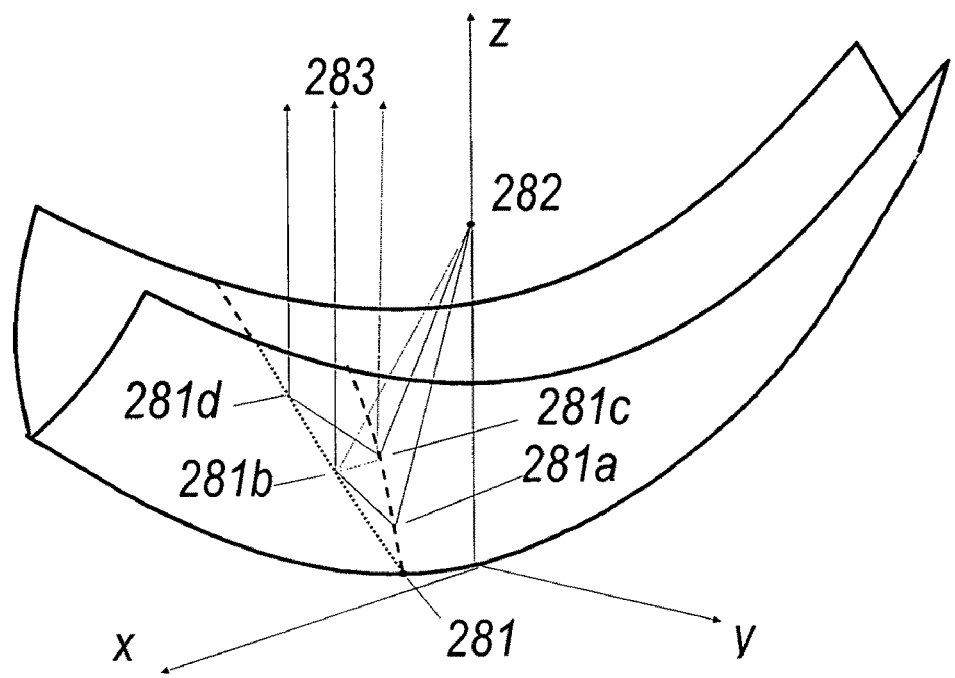
FIG. 28 shows one groove as an exact solution in 3D.

Referring to FIG. 28, the exact solution of the groove is done with the SMS3D (simultaneous multiple surface in 3 dimensions) design method following. The construction is analogous to the SMS2D designs of Type I described in section 5 above, but with the points in three dimensions. The initial point 151 in FIG. 15 is now a point 281 of a parabolic guiding line in FIG. 28. The sequence of calculated points 151a to 151d is the sequence 281a to 281d. The curves obtained are contained in the free-form groove surfaces, and selecting as many initial points 281 as desired along the guiding line provides as many points as desired on the surfaces. The curves obtained are in general non planar (i.e. their torsion is non-zero), except in the case of the initial point at x=0 (for which symmetry reduces the problem to the SMS2D design in FIG. 15). Note that, analogously to the fact that the straight line joining 151 and 152 does not bisect the 90° corner at 151 in FIG. 15, the SMS 3D problem has the degree of freedom of the selections of the orientation of the corners at the points 281 along the guiding line.

8. RXI with Grooved Reflectors

Figure 29:
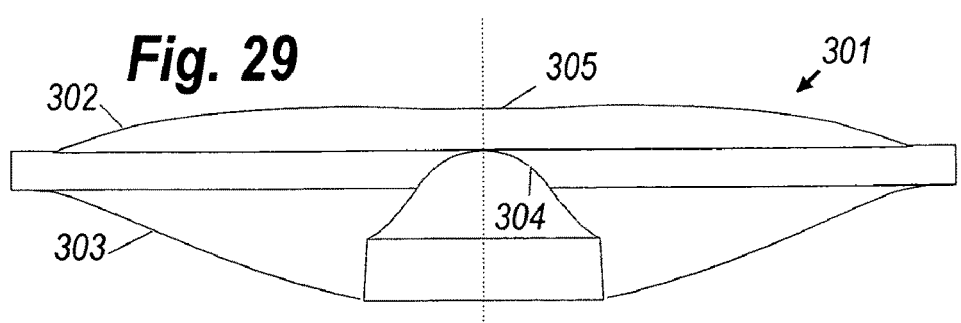
FIG. 29 shows a cross section view of a rotational-symmetric air-gap RXI device.

FIG. 29 shows a cross section view of a rotational-symmetric air-gap RXIR (Refraction-refleXion-Internal reflection-Refraction) device 301, described in U.S. Pat. No. 6,896,381. Its 3 optical surfaces are the aperture 302, the reflector 303, and the dome 304. The aperture 302 acts both as a refracting surface and as a totally internally reflecting surface. The device may be classed as an RXI device if the surface of the dome is shaped so that refraction at that surface does not materially affect the optical properties of the device. The device 301 may be described as an RIXR or IXR device (reversing the order of the optical surfaces) if use as a source collimator, rather than a concentrating collector, is considered primary.

FIG. 30 shows the aperture 302 and FIG. 31 shows reflector surface 303 and the cavity surface 304. The reflector surface 303 is usually covered by a metallic reflector. Its 3 optical surfaces are the entry aperture 302, the reflector 303 (cross-hatched in FIG. 31), and the dome 304 (dotted). When used as a collimating element, the source (an LED for instance) is placed inside the dome. The light emitted by the source is refracted at the dome surface 304 and sent towards the aperture 302 where the light is reflected. This reflection is due to Total Internal Reflection (TIR), and occurs for all the points of the aperture excepting for the points of an inner circle 305 (shaded in FIG. 30) where the angle with which the light impinges on the aperture 302 is too steep for TIR. In general this circle is covered by a metal layer (aluminum or silver, for instance) to get a metallic reflector. The light reflected by the aperture is sent towards the reflector 303 where it is reflected again.

The light reflected by the reflector 303 is sent back to the aperture 302. Unlike the first pass by the aperture, now the rays form an angle with the normals to the aperture surface such that they are refracted and exit the RXI. A proper design of the three optical surfaces gets a high collimation from a wide spreading source such as the LED and in a very compact device.

A substantial part of the cost of the RXI is due to the need for the metal covers or coatings on surfaces 303 and 305. These metal reflectors (both or only one) can be substituted by a grooved reflector working by TIR. This allows the metallization process to be eliminated.

FIG. 32 shows a cross-section view of a rotational-symmetric air-gap RXI 321 similar to that in FIG. 31, but wherein the reflector surface has been substituted by a V-shaped grooved reflector 322.

FIG. 33 shows the three optical surfaces of an RXI 331 in which the metallic surfaces (reflectors 303 and 305 in FIG. 29) have been substituted by grooved reflectors 333 and 335. The dome 334 and the points of the aperture 332 not belonging to the inner circle 335 remain with the same shape as in a metalized device. This RXI does not need any metallization.

Figure 34A:
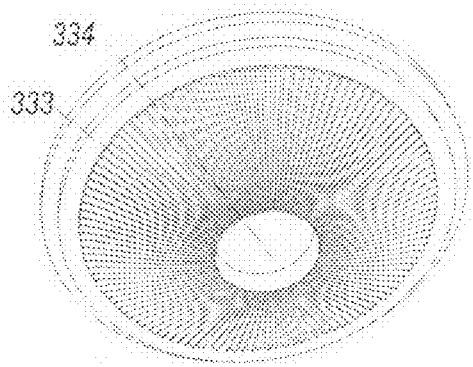
FIG. 34a and FIG. 34b show the back and front grooved reflector surfaces, respectively, of the device of FIG. 33.

FIG. 34a shows the reflector surface 333 of device 331. Since the dome 334 is at the center of the RXI, this grooved reflector 333 does not contain any point of the axis. This is an advantage for the grooved reflector because the density of the grooves theoretically increases to infinity when approaching the axis, and that means that the losses due to rounding of the corners of the grooves will also increase towards the axis.

Figure 34B:
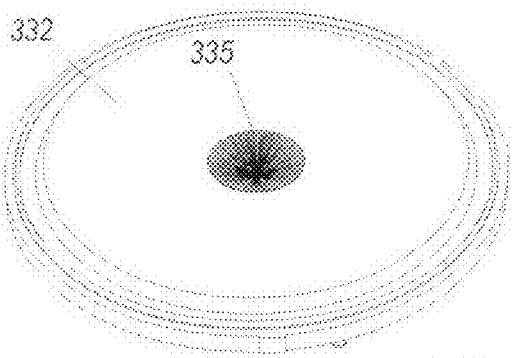

That advantage is not present for the reflector 335 at the center of the aperture 332, seen in FIG. 34b, which does extend to the axis.

Figure 35:
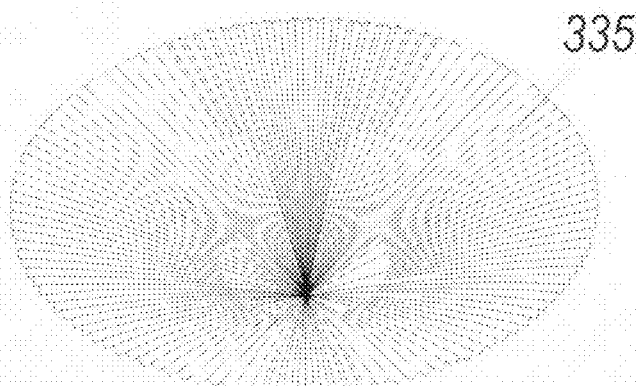
FIG. 35 shows a close up of the front grooved reflector surface of FIG. 34b.

This is more clearly seen in the close up of the reflector 335 shown in FIG. 35.

Figure 36:
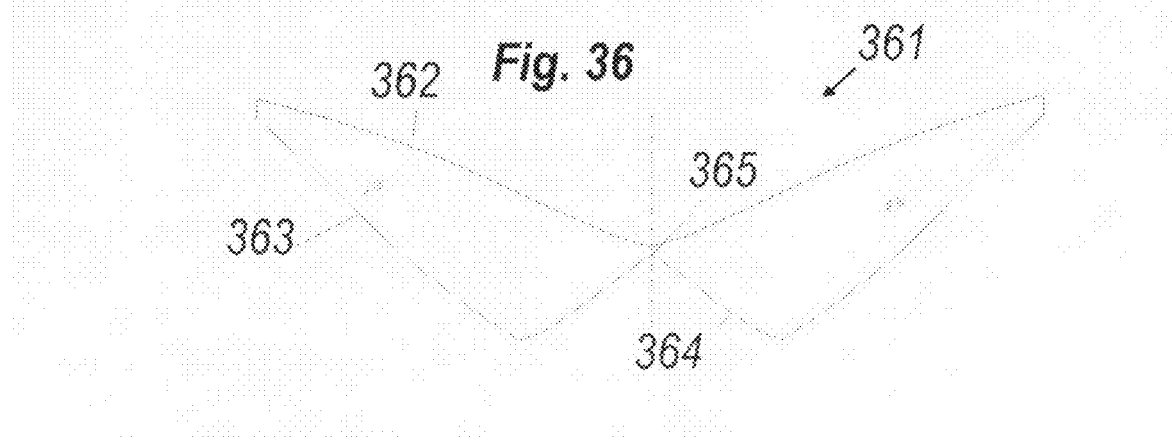
FIG. 36 shows a cross-section of a device that does not need the inner front reflector of FIG. 35.

The losses due to corner rounding are limited by the manufacturing process, and cannot be decreased except by reducing the total length of the corners. For this reason it is preferred to start designing an RXI so it does not need the inner circle reflector 305, i.e., such that all the radiation of interest undergoes TIR after refraction at the dome 304. This can be achieved by two means:

One way of designing an RXI is by prescribing the dome and then designing the aperture and the reflector. The dome can be prescribed with a cusp such that it refracts light. FIG. 36 shows the cross-section of one of these RXI 361. The dome 364 has a central cusp 365 instead of the rounded top shown in FIGS. 29 and 32. Thus, almost all the light emerging from the dome is refracted away from the center of the aperture 362 at angles at which it can be internally reflected by the aperture 362 to reach the reflector. In this case, only the reflector surface must be replaced by a grooved reflector 363 to get a metal-less RXI.

Figure 37:
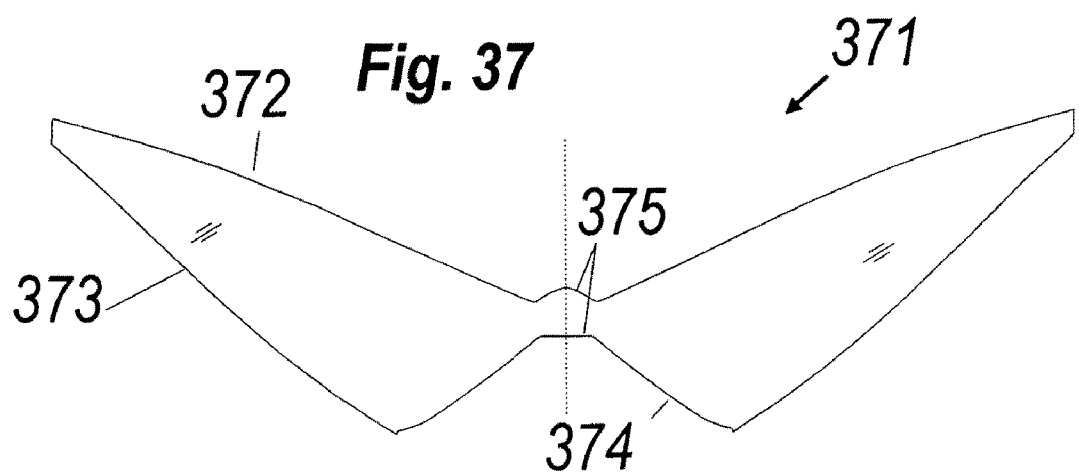
FIG. 37 shows the cross-section of a device with a lens instead of the front reflector of FIG. 35.

The second way is to replace the reflector 305 by a lens. This solution smoothes the collimation because the lens is not able to get as good collimation as the RXI does, but this is not necessarily a disadvantage for some applications. FIG. 37 shows this solution. This RXI 371 is formed by a single dielectric piece and does not need any metallization to work properly. The center of the dome 374 and the inner circle of the aperture 372 have been replaced by two refractive surfaces forming a lens 375. The reflector surface 373 is a grooved reflector.

8.1 RXI with Conical Reflector

Figure 38:
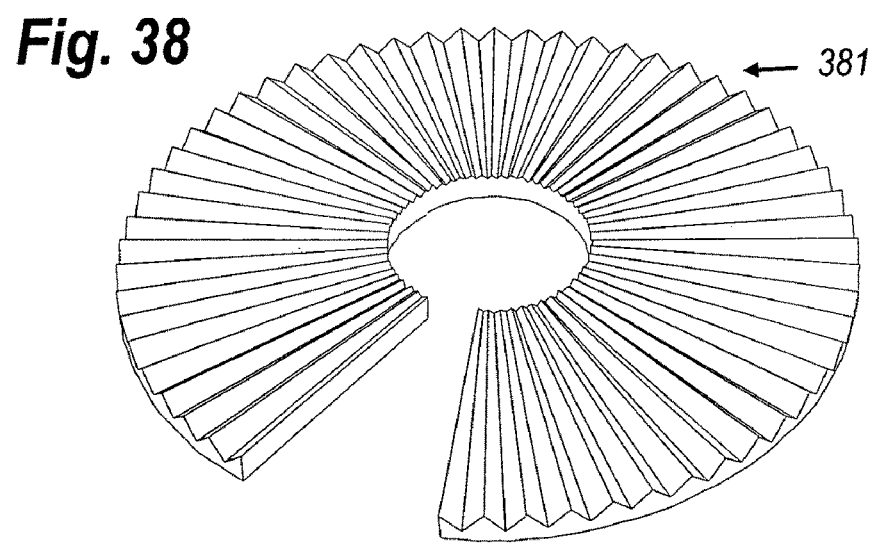
FIG. 38 shows a piece of flat radial grooved film trimmed to be used for an approximately conical reflector.

The reflector surfaces 363 and 373 of FIG. 36 and FIG. 37 look almost conical (i.e., the cross section of these surfaces looks like two symmetric straight lines that meet at a point of the axis of symmetry. The design of the RXI's reflector surface can be forced to be conical. This is achieved by prescribing (as conical) the reflector surface and designing the cavity and the entry aperture surface, instead of what is done usually which is prescribing the cavity surface and designing the reflector and the entry aperture surface. The resulting RXI design is very close to that of FIG. 36 and FIG. 37 because those RXIs have an almost conical reflector surface. Since the cone is a developable surface, this allows manufacturing the reflector by cutting out a sector of circular ring from a flat reflector film. This reflector piece is adapted to the RXI reflector surface. The reflector piece can be mechanically fixed to the dielectric body of the RXI by gluing (or coinjecting RXI and reflector film) although a higher reflectivity can be achieved with a small air gap between the RXI dielectric bulk and the reflector film. The film can be a mirror reflection film (such as ECP 305 film or another mirror reflector Vikuiti film from 3M) or a dielectric retro-reflector film similar to the Vikuiti™ Brightness Enhancement Films (BEF) (also from 3M) but in which the grooves have radial symmetry instead of the parallel, straight linear pattern of the BEF. FIG. 38 shows the piece of flat radial grooved film 381 once trimmed.

8.2 Grooved Reflectors Used as Intensity and Irradiance Mixers

In a conventional RXI used as a collimator of a wide angle source like an LED chip, there is an approximate correspondence between the irradiance at the emitting surface and the intensity in the far field. If there is an obstacle in the emitting surface (for instance a metal contact) the far field has a corresponding dark region. If we use 4 different color LEDs instead of a single chip LED, then the far field pattern is of different colors in 4 different sectors. Because reflection in a grooved reflector is not a conventional reflection as explained in Section 0, there is not the same correspondence between the irradiance at the source emitter and the far field intensity. This effect can be used to mix the light. For instance we can use 4 different color LEDs chips at the emitter location and get a blended color in the far field (and also near field) without the need of any extra element. For this purpose it is better to design a conventional RXI close to the aplanatic condition.

Figure 39A:
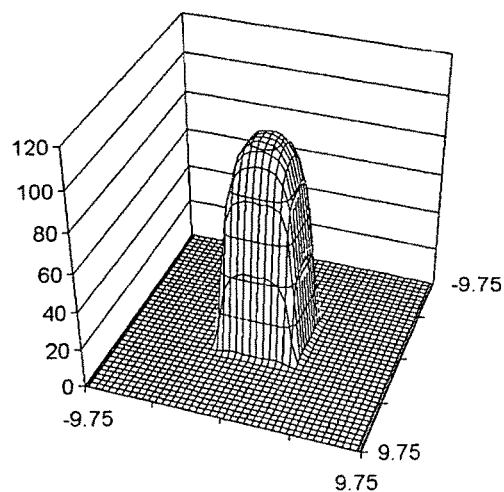
FIG. 39a shows an intensity pattern for a conventional RXI device close to the aplanatic condition when used as a collimating source with the emitter centered on axis.
Figure 39B:
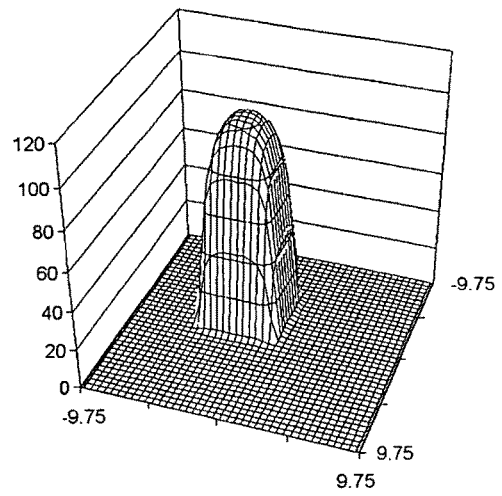
FIG. 39b shows an intensity pattern for a conventional RXI similar to that of FIG. 39a when the emitter is placed off the axis.
Figure 40:
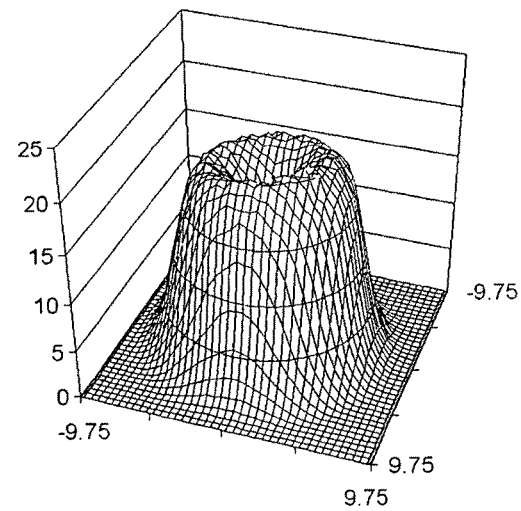
FIG. 40 shows an intensity pattern for a grooved RXI similar to that shown in FIG. 32 when the emitter is placed off the axis as in FIG. 39b.

FIG. 39a shows the intensity pattern for a conventional RXI close to the aplanatic condition. The vertical axis is the intensity in candles per lumen emitted by the emitter. The two horizontal axes are angular coordinates of the direction in degrees and centered at the direction normal to the RXI. The emitter size is 1×1 in arbitrary units and the aperture diameter is 35 in these units. FIG. 39b shows the intensity pattern when the emitter is placed off the axis so its center is at (0.6,0.6). Since the emitter size is 1×1, no point of the emitter is on the axis. The result of this change in the intensity is essentially that the pattern is shifted from the center. If, in addition to this off-axis emitter shifting, the reflector surface of the RXI is substituted by a suitably designed grooved reflector then the intensity pattern regains rotational symmetry around the normal direction, even though the emitter is completely off-axis. This new intensity pattern is shown in FIG. 40.

This figure also shows a decrease of the intensity due to the averaging effect of the intensity pattern of FIG. 39b around the origin.

The important fact here is that the intensity pattern is almost rotationally symmetric about the RXI axis, even though the emission is not. This effect can be used to mix light of different colors by placing 4 different color LED chips so the axis of rotational symmetry of the original RXI passes through the center of this arrangement. Each LED produces a rotationally symmetric pattern which is mixed with the patterns of the other three LEDs.

The same effect can be used to homogenize the irradiance pattern at the receiver when the RXI is used as a concentrator of radiation, for instance for photovoltaic solar energy applications where the receiver is a solar cell. In a conventional RXI there is a hot spot on the cell at a position corresponding to the sun's angular position with respect to the concentrator. The use of a grooved reflector can make the irradiance at the cell more uniform without degrading the acceptance angle or the efficiency.

9. Cavities with Grooved Reflectors

Figure 41:
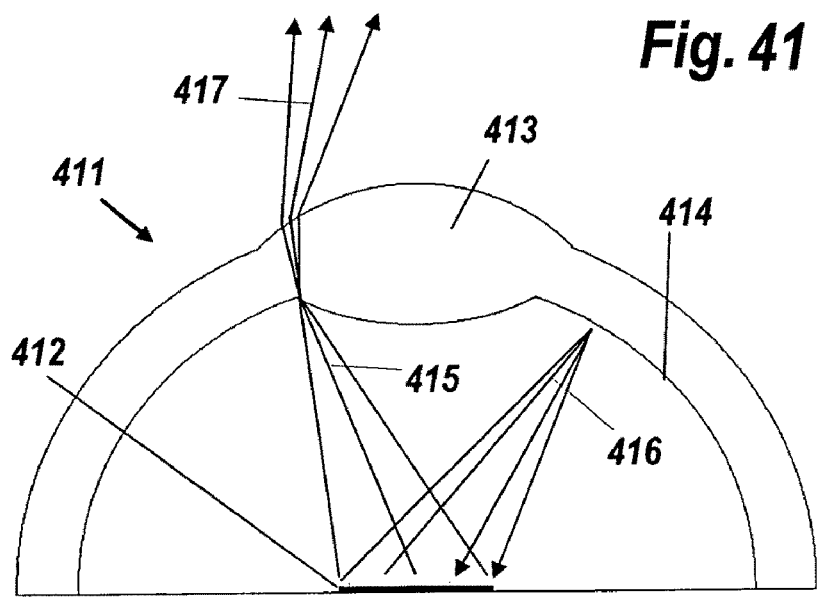
FIG. 41 shows a reflecting cavity.

FIG. 41 shows a reflecting cavity 411 as disclosed in US patent Application 2008/08291682 A1 by Falicoff et al., the purpose of which is to increase the brightness emitted by an LED chip 412. The cavity comprises a lens 413 and an elliptic reflector 414. Part of the radiation 415 emitted by the chip finds the lens and is collimated by it. The remaining radiation 416 is reflected back to the chip, contributing to an increase in the brightness of radiation 417 exiting the device. The lens 413 is not necessary for increasing the brightness.

Figure 42:
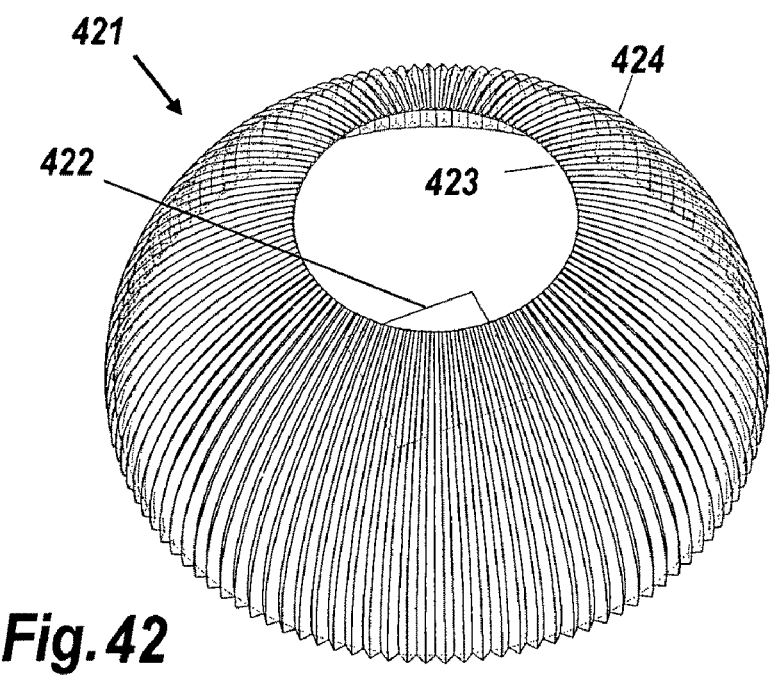
FIG. 42 shows a cavity similar to that of FIG. 42 but with a grooved reflector forming a reflecting cavity surface.

The reflector surface in this device can be replaced by a grooved reflector as shown in the cavity 421 of FIG. 42. Unlike the cavity of FIG. 41, in the case of using the grooved reflector of FIG. 42 it is preferable to have a circular emitting surface instead of the squared one 422. The lens 423 is identical to the previous one. The only change is in the grooved reflector 424.

Figure 43:
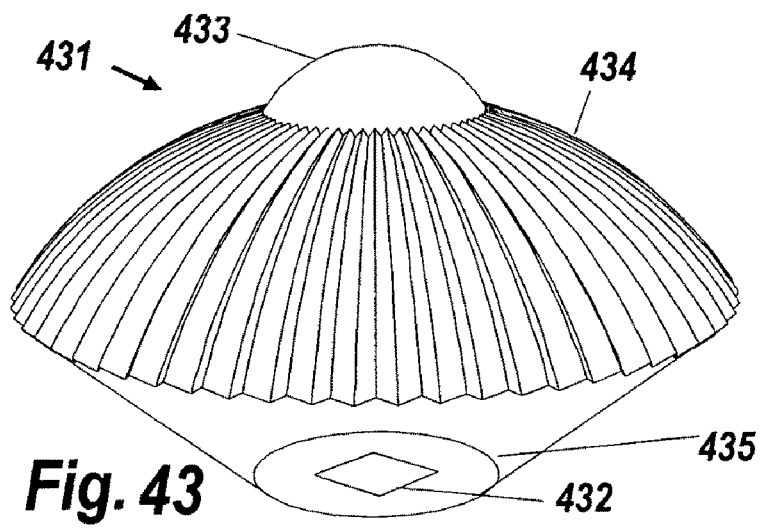
FIG. 43 shows a device similar to FIG. 41 but made of a single dielectric piece, in which the LED is not in optical contact with the piece.

When the size of the emitter is small, the configuration shown in FIG. 43 may be more convenient. In this case the whole optical device 431 is made of a single dielectric piece of refractive index n. The LED chip 432 is not in optical contact with this piece, i.e., there is a small air gap between them at the device entrance 435. The light entering into the dielectric is collimated within the angle arcsin(1/n). Part of this light reaches the lens 433 and exits the device with a certain collimation. The remaining part of this light is reflected back by the grooved reflector 434 which does not need to cover a hemisphere because of the partial collimation by refraction at the entrance 435. The Fresnel reflection at the flat surface 435 helps to increase the brightness of the source.

Figure 44:
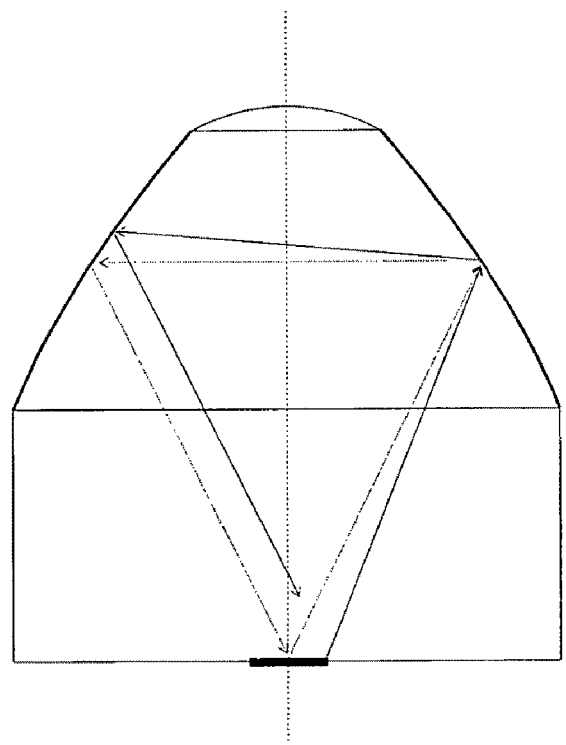
FIG. 44 and FIG. 45 show another possibility to provide such a brightness enhancement and collimating cavity, using a groove profile as that of FIG. 15.
Figure 45:
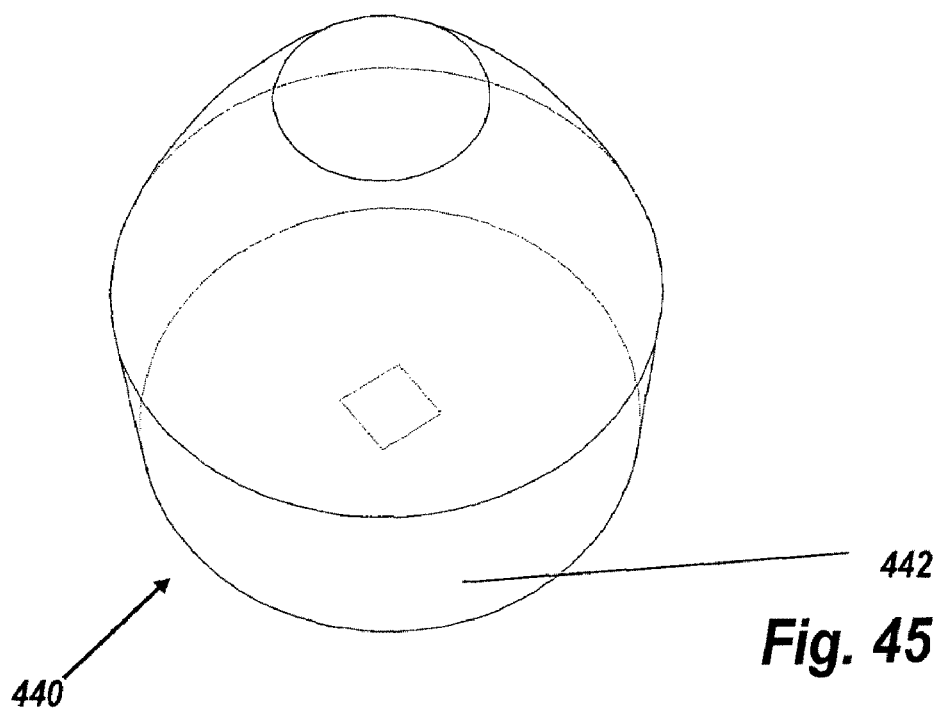
Figure 46:
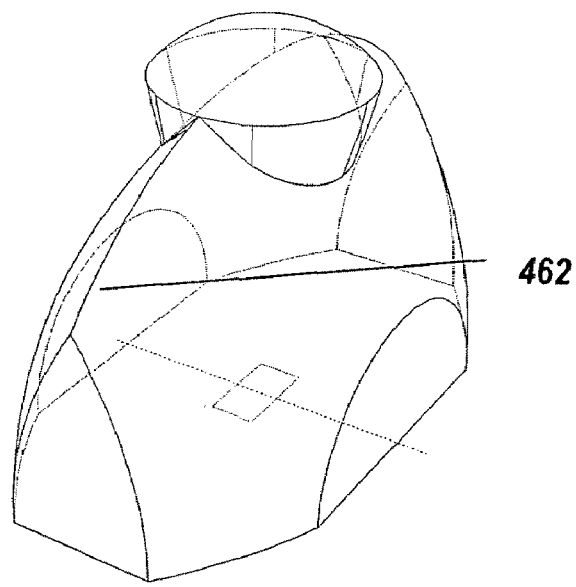
FIG. 46 shows the use of a single groove to provide such a brightness enhancement and collimating cavity.

FIG. 44 and FIG. 45 show another possibility to provide such a brightness enhancement and collimating cavity, using a groove profile as that of FIG. 15. The device 440 shown in FIGS. 44 and 45 has an approximately cylindrical side wall that does not need to be reflected because of partial collimation by refraction at the entrance, as in FIG. 43. On the other hand, FIG. 46 shows the use of a single groove 462 to provide such a brightness enhancement and collimating cavity.

The invention claimed is:

1. A method of designing a grooved reflector, comprising:
selecting two given wavefronts; and
designing two surfaces meeting at an edge to form a groove such that the rays of each of the given wavefront become rays of a respective one of the given wavefronts after a reflection at each of the surfaces.

2. The method according to claim 1, wherein the rays of each given wavefront become rays of the other given wavefront after said reflections.

3. The method according to claim 1, wherein the rays of each given wavefront become rays of the same given wavefront after said reflections.

4. The method according to claim 1, wherein the given wavefronts are curved.

5. The method according to claim 1, further comprising selecting a point such that the two rays associated with the two given wavefronts and passing through that point are not coincident, and designing the two said surfaces such that said given point is on said edge at which the two surfaces meet.

6. The method according to claim 1, comprising designing an initial portion of each said surface such that a fan of incident rays reflected at an edge point of the other of said surfaces are collimated by said initial portion into rays of one of said given wavefronts.

7. The method according to claim 6, further comprising designing a subsequent portion of each said surface such that rays of rays of one of said given wavefronts become rays of the other of said given wavefronts after reflection at said initial portion of one of said surfaces and said subsequent portion of the other of said surfaces, in either order.

8. The method of claim 1, comprising designing a guiding line, along which said edge of the groove lies, such that the guiding line lies on a surface which coincides with a Cartesian oval reflector that would couple said two given wavefronts.

9. The method of claim 8, wherein the reflector has a plurality of grooves, the said guiding lines of which lie on the same said Cartesian oval surface.

10. The method of claim 1, wherein for every point of said edge the tangent vector to said edge is coplanar to the rays of the two wavefronts passing through said point.

11. The method of claim 1, wherein at said edge the normal vectors to the two surfaces forming a groove reflectors form 90° to each other.

12. The method of claim 1, further comprising truncating polynomial representations of the two designed surfaces.

13. The method of claim 1, further comprising forming said surfaces as Kohler integrators.

14. The method of claim 1, further comprising designing the two surfaces as surfaces of a dielectric body through which the rays pass.

15. The method of claim 14, further comprising the two surfaces as totally internally reflecting surfaces of the dielectric body.

16. The method of claim 14, further comprising designing an opposite surface of said dielectric body with refracting elements through which said rays of said wavefronts enter and leave said dielectric body.

17. The method of claim 16, further comprising designing said refracting elements to form Kohler pairs with their images after reflection in both said surfaces.

18. The method of claim 1, further comprising manufacturing a grooved reflector according to the design.

19. The method of claim 1, further comprising manufacturing an optical device incorporating said grooved reflector.

* * * * *